US012699334B2

(12) United States Patent
Ando et al.

(10) Patent No.: US 12,699,334 B2
(45) Date of Patent: Aug. 4, 2026

(54) ELECTROPHOTOGRAPHIC PHOTORECEPTOR, ELECTROPHOTOGRAPHIC PHOTORECEPTOR CARTRIDGE, AND IMAGE FORMING DEVICE

(71) Applicant: Mitsubishi Chemical Corporation, Tokyo (JP)

(72) Inventors: Akira Ando, Tokyo (JP); Takahiro Choda, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 443 days.

(21) Appl. No.: 18/135,815

(22) Filed: Apr. 18, 2023

(65) Prior Publication Data

US 2023/0273535 A1 Aug. 31, 2023

Related U.S. Application Data

(63) Continuation of application No. PCT/JP2021/038593, filed on Oct. 19, 2021.

(30) Foreign Application Priority Data

Oct. 20, 2020 (JP) ................................ 2020-176132

(51) Int. Cl.
*G03G 5/147* (2006.01)
*G03G 5/047* (2006.01)

(52) U.S. Cl.
CPC ......... *G03G 5/14769* (2013.01); *G03G 5/047* (2013.01); *G03G 5/14704* (2013.01)

(58) Field of Classification Search
CPC . G03G 5/14769; G03G 5/047; G03G 5/14704
See application file for complete search history.

(56) References Cited

U.S. PATENT DOCUMENTS 8,354,212 B2 1/2013 Hayata et al.
9,417,538 B2 8/2016 Bellino et al.
(Continued)

FOREIGN PATENT DOCUMENTS

JP H10-221874 A 8/1998
JP 2001-033997 A 2/2001
(Continued)

OTHER PUBLICATIONS

International Search Report issued in corresponding International Patent Application No. PCT/JP2021/038593 dated Jan. 11, 2022.

*Primary Examiner* — David H Banh
(74) *Attorney, Agent, or Firm* — Morgan, Lewis & Bockius LLP

(57) ABSTRACT

As an electrophotographic photoreceptor including a protective layer (an outermost layer), a photosensitive layer and a conductive support, wherein the protective layer (the outermost layer) comprises a polymer obtained by polymerizing a compound having a chain polymerizable functional group, and the photosensitive layer comprises a hole transport material satisfying the following formula (1) and an electron transport material satisfying the following formula (2):

$$600 \leq a \tag{1}$$

$$400 \leq b \tag{2}$$

in the formula (1), a represents a molecular weight of the hole transport material, and in the formula (2), b represents a molecular weight of the electron transport material.

18 Claims, 1 Drawing Sheet

(56) References Cited

U.S. PATENT DOCUMENTS

| | | | | |
|---|---|---|---|---|
| 9,671,705 | B2 | 6/2017 | Kitagawa et al. | |
| 10,802,411 | B2 | 10/2020 | Iwashita et al. | |
| 2007/0231720 | A1 | 10/2007 | Mori et al. | |
| 2010/0150606 | A1* | 6/2010 | Tamoto | G03G 5/14704 430/132 |
| 2010/0330475 | A1* | 12/2010 | Tamoto | G03G 5/0732 399/346 |
| 2011/0038651 | A1 | 2/2011 | Hayata et al. | |
| 2013/0022902 | A1 | 1/2013 | Shimoyama et al. | |
| 2015/0192869 | A1 | 7/2015 | Takezawa et al. | |
| 2015/0346619 | A1 | 12/2015 | Kitagawa et al. | |
| 2017/0153560 | A1* | 6/2017 | Okada | C07D 221/18 |
| 2017/0160655 | A1 | 6/2017 | Adachi et al. | |
| 2017/0242353 | A1* | 8/2017 | Fuchigami | G03G 5/0696 |
| 2017/0261870 | A1* | 9/2017 | Yumita | G03G 5/14704 |
| 2017/0285498 | A1* | 10/2017 | Yoshizawa | G03G 5/0607 |
| 2018/0004101 | A1 | 1/2018 | Wada et al. | |
| 2019/0025719 | A1* | 1/2019 | Yamazaki | G03G 5/06147 |
| 2019/0219937 | A1* | 7/2019 | Fujii | G03G 5/0564 |
| 2019/0346780 | A1* | 11/2019 | Zhu | G03G 5/0607 |
| 2020/0057396 | A1 | 2/2020 | Iwashita et al. | |
| 2020/0363740 | A1* | 11/2020 | Matsusaki | G03G 5/14708 |
| 2021/0026268 | A1 | 1/2021 | Murakami et al. | |
| 2023/0068130 | A1 | 3/2023 | Ando et al. | |

FOREIGN PATENT DOCUMENTS

| | | | |
|---|---|---|---|
| JP | 2005-331965 | A | 12/2005 |
| JP | 2006-178367 | A | 7/2006 |
| JP | 2007-293247 | A | 11/2007 |
| JP | 2011-242574 | A | 12/2011 |
| JP | 2011-257457 | A | 12/2011 |
| JP | 2012-098500 | A | 5/2012 |
| JP | 2012-123238 | A | 6/2012 |
| JP | 2012-128324 | A | 7/2012 |
| JP | 2013-041259 | A | 2/2013 |
| JP | 2015-114647 | A | 6/2015 |
| JP | 2015-132640 | A | 7/2015 |
| JP | 2016-126163 | A | 7/2016 |
| JP | 2016-170408 | A | 9/2016 |
| JP | 2017-107004 | A | 6/2017 |
| JP | 2021-021941 | A | 2/2021 |
| WO | 2010/035683 | A1 | 4/2010 |
| WO | 2015/008322 | A1 | 1/2015 |
| WO | 2018/198590 | A1 | 11/2018 |
| WO | 2021/193678 | A1 | 9/2021 |

* cited by examiner

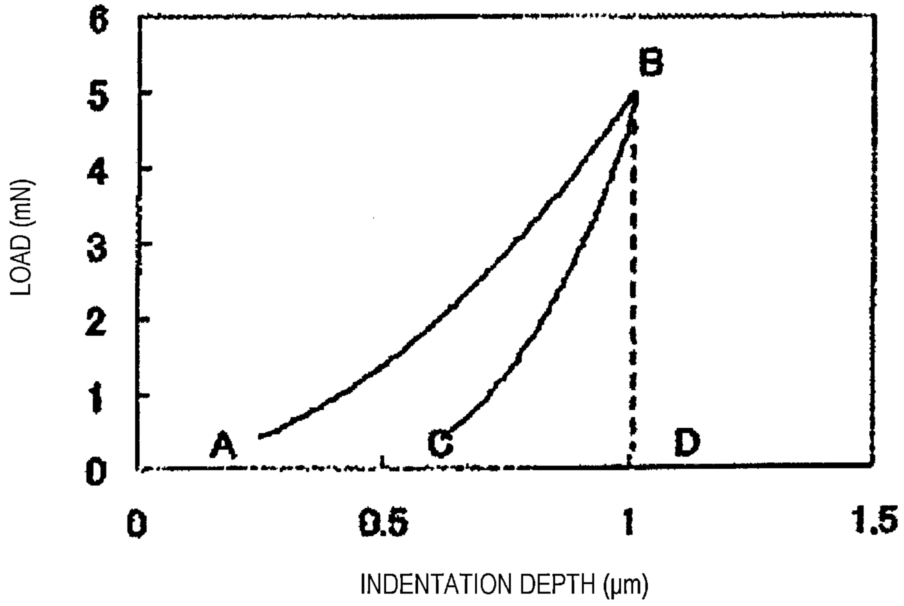
6
5
4
3
2
1
0
LOAD (mN)
B
A
C
D
0
0.5
1
1.5
INDENTATION DEPTH (μm)

ELECTROPHOTOGRAPHIC PHOTORECEPTOR, ELECTROPHOTOGRAPHIC PHOTORECEPTOR CARTRIDGE, AND IMAGE FORMING DEVICE

TECHNICAL FIELD

The present invention relates to an electrophotographic photoreceptor and an image forming device to be used in a copier, a printer, and the like. More specifically, the present invention relates to an electrophotographic photoreceptor excellent in mechanical properties and adhesion, and an electrophotographic photoreceptor cartridge and an image forming device including the photoreceptor.

BACKGROUND ART

Electrophotographic technology has been widely used in fields of a copier, a printer, a multi-function machine, and digital printing because a high-quality image can be obtained at a high speed. As an electrophotographic photoreceptor (hereinafter, also simply referred to as a "photoreceptor") serving as a core of the electrophotographic technology, a photoreceptor using an organic photoconductive material is mainly used, which has advantages such as being pollution-free, easy to form a film, and easy to produce.

From the viewpoint of layer configuration, examples of the organic electrophotographic photoreceptor include a single-layered electrophotographic photoreceptor (hereinafter, referred to as a single-layered photoreceptor) with a charge generation material and a charge transport material in the same layer and a multi-layered electrophotographic photoreceptor (hereinafter, referred to as a multi-layered photoreceptor) with a charge generation material and a charge transport material separated and laminated in separate layers (a charge generation layer and a charge transport layer).

Among them, most of current photoreceptors are the multi-layered photoreceptors because it is easy to optimize the function of each layer and to control characteristics in view of photoreceptor design. Most multi-layered photoreceptors have a charge generation layer and a charge transport layer on a substrate in this order.

In the charge transport layer, there are very few suitable electron transport materials, whereas many materials with good characteristics are known as a hole transport material. Therefore, the multi-layered photoreceptor generally has a charge generation layer and a charge transport layer on a substrate in this order, and is used in a negative charging method by which a photoreceptor surface is negatively charged.

In the negative charging method, an amount of ozone generated from a charger is larger than that in a positive charging method by which a photoreceptor surface is positively charged, which causes a problem in degradation of the photoreceptor.

On the other hand, the single-layered photoreceptor can in principle be used either in the negative charging method or in the positive charging method, but the positive charging method is advantageous because the generation amount of ozone, which is a problem in the above-described multi-layered photoreceptor, can be reduced and the sensitivity is generally higher than that in the negative charging method. In addition, the single-layered photoreceptor has few coating steps and has an advantage of being advantageous in terms of resolution. Therefore, the single-layered photoreceptor is inferior to a negatively charged multi-layered photoreceptor in terms of electrical characteristics, but has been partially put into practical use, and various improvements and studies have been made up to now (PTLs 1 and 2).

Since the electrophotographic photoreceptor is used repeatedly in an electrophotographic process, i.e., in a cycle of charging, exposure, development, transfer, cleaning, static elimination, and the like, the electrophotographic photoreceptor is subjected to various stresses and deteriorates during the process. In particular, abrasion of a photosensitive layer surface due to rubbing of a cleaning blade, a magnetic brush, or the like, contact with a developer, paper, or the like, and damage due to mechanical deterioration such as generation of scratches or peeling of a film are likely to appear on an image and directly impair image quality, which is a major factor for limiting a life of the photoreceptor.

As technology for improving mechanical strength or abrasion resistance of the photoreceptor surface, there is disclosed a photoreceptor in which a layer containing a chain polymerizable functional group-containing compound is formed as a binder resin on an outermost layer of the photoreceptor, and polymerized by applying energy such as heat, light, or radiation to form a cured resin layer (for example, see PTLs 3 and 4).

CITATION LIST

Patent Literature

PTL 1: JP 2001-33997 A
PTL 2: JP 2005-331965 A
PTL 3: U.S. Pat. No. 941,753,8
PTL 4: WO 2010/035683

SUMMARY OF INVENTION

Technical Problem

In order to improve the electrical characteristics of the photoreceptor, it is considered effective to increase contents of a hole transport material (HTM) and an electron transport material (ETM) in the photosensitive layer.

However, increasing the contents of the hole transport material and the electron transport material in the photosensitive layer tends to concentrate the hole transport material and the electron transport material on the photosensitive layer surface. As a result of studies by the present inventors, it has been found that when a protective layer containing a cured resin is formed (particularly, when the protective layer is formed as an outermost layer), adhesion between the protective layer (the outermost layer) and a photosensitive layer in contact with the protective layer (the outermost layer) is remarkably deteriorated, and the protective layer (the outermost layer) may be peeled off due to a stress such as sliding with printing paper or a member such as a charging roller, a developing roller, a transfer roller, and a cleaning blade disposed in contact with a photoreceptor during an electrophotographic process. Further, a Martens hardness of the photoreceptor surface decreases, and an elastic deformation ratio of the photoreceptor surface decreases.

The present invention has been made in view of the above problems. That is, an object of the present invention is to provide an electrophotographic photoreceptor having a high Martens hardness, a high elastic deformation ratio, and excellent adhesion between a photosensitive layer and a protective layer (an outermost layer), and an electrophotographic photoreceptor cartridge and an image forming device including the electrophotographic photoreceptor.

Solution to Problem

As a result of intensive studies on an electrophotographic photoreceptor that can satisfy the above object, the present inventors have found that the above problems can be solved when a molecular weight of a hole transport material and a molecular weight of an electron transport material, a ratio of a substance amount (a molar amount) of the hole transport material, or a ratio of the molecular weight of the hole transport material in a photosensitive layer are each within a specific range, and have completed the present invention.

A gist of the present invention lies in the following [1] to [19].

[1] An electrophotographic photoreceptor including:

a conductive support; and at least a photosensitive layer and a protective layer provided on the conductive support, in which the protective layer has a structure obtained by polymerizing a compound having a chain polymerizable functional group, and the photosensitive layer in contact with the protective layer contains a hole transport material satisfying the following formula (1) and an electron transport material satisfying the following formula (2), $$600 \leq a \quad (1)$$

$$400 \leq b \quad (2)$$

(in the formula (1), a represents a molecular weight of the hole transport material, and in the formula (2), b represents a molecular weight of the electron transport material).

[2] An electrophotographic photoreceptor including:

a conductive support; and at least a photosensitive layer and an outermost layer provided on the conductive support, in which the outermost layer has a structure obtained by polymerizing a compound having a chain polymerizable functional group, and the photosensitive layer in contact with the outermost layer contains a hole transport material satisfying the following formula (1) and an electron transport material satisfying the following formula (2), $$600 \leq a \quad (1)$$

$$400 \leq b \quad (2)$$

(in the formula (1), a represents a molecular weight of the hole transport material, and in the formula (2), b represents a molecular weight of the electron transport material).

[3] The electrophotographic photoreceptor according to above [1] or [2], in which the photosensitive layer in contact with the outermost layer or the protective layer is a single layer containing at least a binder resin, a charge generation material, the hole transport material, and the electron transport material.

[4] The electrophotographic photoreceptor according to any one of above [1] to [3], in which the hole transport material satisfies the following formula (1'), $$600 \leq a \leq 1200 \quad (1')$$

(in the formula (1'), a represents the molecular weight of the hole transport material).

[5] The electrophotographic photoreceptor according to any one of above [1] to 4, in which the electron transport material satisfies the following formula (2'), $$400 \leq b \leq 1000 \quad (2')$$

(in the formula (2'), b represents the molecular weight of the electron transport material).

[6] The electrophotographic photoreceptor according to any one of above [1] to [5], in which the photosensitive layer satisfies the following formula (3), $$0.15 \leq (A/a)+(B/b) \quad (3)$$

(in the formula (3), A represents a content (part by mass) of the hole transport material with respect to 100 of the binder resin content, a represents the molecular weight of the hole transport material, B represents a content (part by mass) of the electron transport material with respect to 100 of the binder resin content, and b represents the molecular weight of the electron transport material).

[7] The electrophotographic photoreceptor according to any one of above [1] to [6], in which the photosensitive layer satisfies the following formula (4), $$0.80 \leq A/B \leq 3.00 \quad (4)$$

(in the formula (4), A represents the content (part by mass) of the hole transport material with respect to 100 of the binder resin content, and B represents the content (part by mass) of the electron transport material with respect to 100 of the binder resin content).

[8] The electrophotographic photoreceptor according to any one of above [1] to [7], in which the photosensitive layer satisfies the following formula (5), $$1.20 \leq (B/b)/(A/a) \leq 1.60 \quad (5)$$

(in the formula (5), A represents the content (part by mass) of the hole transport material with respect to 100 of the binder resin content, a represents the molecular weight of the hole transport material, B represents the content (part by mass) of the electron transport material with respect to 100 of the binder resin content, and b represents the molecular weight of the electron transport material).

[9] The electrophotographic photoreceptor according to any one of above [1] to [8], in which a ratio (a/b) of the molecular weight a of the hole transport material to the molecular weight b of the electron transport material is 1.40 or more and 1.90 or less.

[10] The electrophotographic photoreceptor according to any one of above [1] to [9], in which the electrophotographic photoreceptor is a positively charged type.

[11] The electrophotographic photoreceptor according to any one of above [1] to [10], in which the outermost layer or the protective layer has a structure obtained by radically polymerizing the compound having a chain polymerizable functional group.

[12] The electrophotographic photoreceptor according to any one of above [1] to [11], in which the outermost layer or the protective layer contains metal oxide fine particles.

[13] The electrophotographic photoreceptor according to above [12], in which the metal oxide fine particles are surface-treated with a surface treatment agent having a polymerizable functional group.

[14] The electrophotographic photoreceptor according to any one of above [1] to [13], in which the compound having a chain polymerizable functional group is a urethane acrylate.

[15] The electrophotographic photoreceptor according to any one of above [1] to [14], in which the electron transport material contained in the photosensitive layer has a structure represented by the following formula (6).

Formula (6)

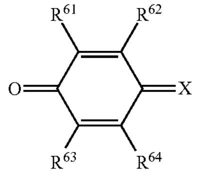

In the formula (6), $R^{61}$ to $R^{64}$ each independently represent a hydrogen atom, an alkyl group having 1 or more and 20 or less carbon atoms which may be substituted, or an alkenyl group having 2 or more and 20 or less carbon atoms which may be substituted, and $R^{61}$ and $R^{62}$ or $R^{63}$ and $R^{64}$ may be bonded to each other to form a cyclic structure. X represents an organic residue having a molecular weight of 120 or more and 250 or less.

[16] An electrophotographic photoreceptor including:

a conductive support; and at least a photosensitive layer and a protective layer provided on the conductive support, in which the protective layer has a structure obtained by polymerizing a compound having a chain polymerizable functional group, the photosensitive layer in contact with the protective layer contains at least a binder resin, a hole transport material, and an electron transport material, and the photosensitive layer in contact with the protective layer satisfies the following formula (5), $$1.20 \leq (B/b)/(A/a) \leq 1.60 \quad (5)$$

(in the formula (5), A represents a content (part by mass) of the hole transport material with respect to 100 of the binder resin content, a represents a molecular weight of the hole transport material, B represents a content (part by mass) of the electron transport material with respect to 100 of the binder resin content, and b represents a molecular weight of the electron transport material).

[17] An electrophotographic photoreceptor including:

a conductive support; and at least a photosensitive layer and a protective layer provided on the conductive support, in which the protective layer has a structure obtained by polymerizing a compound having a chain polymerizable functional group, the photosensitive layer in contact with the protective layer contains at least a hole transport material and an electron transport material, and a ratio (a/b) of a molecular weight a of the hole transport material to a molecular weight b of the electron transport material is 1.40 or more and 1.90 or less.

[18] An electrophotographic photoreceptor cartridge including: the electrophotographic photoreceptor according to any one of above [1] to [17].

[19] An image forming device including: the electrophotographic photoreceptor according to any one of above [1] to [17].

Advantageous Effects of Invention

According to the present invention, it is possible to provide an electrophotographic photoreceptor having a high Martens hardness, a high elastic deformation ratio, and excellent adhesion between a photosensitive layer and the outermost layer or the protective layer (also simply referred to as "adhesion"), and an electrophotographic photoreceptor cartridge and an image forming device including the electrophotographic photoreceptor.

BRIEF DESCRIPTION OF DRAWINGS

FIG. 1 is a graph showing a load curve with respect to an indentation depth of an indenter when measuring a Martens hardness and an elastic deformation ratio of a photoreceptor surface.

DESCRIPTION OF EMBODIMENTS

Hereinafter, embodiments for carrying out the present invention (hereinafter, embodiments of the invention) will be described in detail. The present invention is not limited to the following embodiments, and various modifications can be made within the scope of the gist of the present invention.

<<Electrophotographic Photoreceptor>>

An electrophotographic photoreceptor according to the present invention includes a conductive support, and at least a photosensitive layer and a protective layer provided on the conductive support, in which the protective layer has a structure obtained by polymerizing a compound having a chain polymerizable functional group. From the viewpoint of further obtaining the effects of the present invention, the protective layer is preferably an outermost layer.

A charging method for the electrophotographic photoreceptor according to the present invention may be either a negative charging method by which a photoreceptor surface is negatively charged or a positive charging method by which a photoreceptor surface is positively charged. From the viewpoint of further obtaining the effects of the present invention, a positively charged electrophotographic photoreceptor is preferred.

The conductive support, the photosensitive layer, the protective layer (the outermost layer) and the like, which constitute the electrophotographic photoreceptor according to the present invention, will be sequentially described below. In addition, in the description, the "protective layer (outermost layer)" means a protective layer or an outermost layer.

<Conductive Support>

First, the conductive support used in the photoreceptor according to the present invention will be described.

The conductive support is not particularly limited as long as it supports a single-layered photosensitive layer to be described later and the protective layer (the outermost layer) and exhibits conductivity. As the conductive support, for example, a metal material such as aluminum, an aluminum alloy, stainless steel, copper, or nickel, a resin material provided with conductivity by allowing a conductive powder of a metal, carbon, tin oxide, or the like to coexist, a resin obtained by depositing or applying a conductive material such as aluminum, nickel, or an indium tin oxide alloy (ITO) on a surface thereof, glass, or paper is mainly used.

The conductive support can be in a form of a drum, sheet, belt, or the like. For example, a conductive material having an appropriate resistance value may be applied onto the conductive support made of a metal material in order to control conductivity, surface properties, and the like and to cover defects.

When a metal material such as an aluminum alloy is used as the conductive support, the metal material may be coated with an anodized film before use.

An average film thickness of the anodized film is generally 20 μm or less, and particularly preferably 7 μm or less.

A surface of the conductive support may be smooth, or may be roughened by using a special cutting method or by performing a grinding treatment. The surface may be roughened by mixing particles having an appropriate particle diameter with the material constituting the support.

An undercoat layer to be described later may be provided between the conductive support and the photosensitive layer in order to improve adhesion, blocking properties, and the like.

<Photosensitive Layer>

The photosensitive layer in the electrophotographic photoreceptor according to the present invention may be of a single-layered or a multi-layered as long as the photosensitive layer in contact with the protective layer (the outermost layer) has a structure described below. Among them, the photosensitive layer in contact with the protective layer (the outermost layer) is preferably a single-layered photosensitive layer containing at least a binder resin, a charge generation material, a hole transport material, and an electron transport material in the same layer.

As described above, a reason why adhesion between the protective layer (the outermost layer) and the photosensitive layer in contact with the protective layer (the outermost layer) deteriorates or a Martens hardness of the photoreceptor surface and an elastic deformation ratio of the photoreceptor surface decrease is considered to be due to concentration of the hole transport material and concentration of the electron transport material on a photosensitive layer surface. Here, the “photosensitive layer surface” means an interface on a side where the photosensitive layer is in contact with the protective layer (the outermost layer). More specifically, it is presumed that when the hole transport material is concentrated on the photosensitive layer surface, the hole transport material becomes a steric hindrance and inhibits an entanglement between a cured film of the protective layer (the outermost layer) and the binder resin of the photosensitive layer, resulting in deterioration of the adhesion as described above. In addition, it is presumed that when the electron transport material is concentrated on the photosensitive layer surface, the electron transport material traps a radical generated by a curing reaction of the protective layer (the outermost layer) and inhibits a chain polymerization reaction, i.e., the curing reaction in the protective layer (the outermost layer), so that the Martens hardness of the photoreceptor surface and the elastic deformation ratio of the photoreceptor surface decrease.

In order to solve such a problem, in a first embodiment according to the present invention, a molecular weight of the hole transport material and a molecular weight the electron transport material are each set equal to or greater than a predetermined value, and a motion of the hole transport material and a motion of the electron transport material in the photosensitive layer can be prevented. Therefore, a migration to the photosensitive layer surface can be prevented, concentration on the photosensitive layer surface can be prevented, and the adhesion, the Martens hardness, and the elastic deformation ratio can be made preferred.

In addition, in a second embodiment according to the present invention, a ratio of a substance amount (a molar amount) of the hole transport material to a substance amount (a molar amount) of the electron transport material in the photosensitive layer is adjusted to a predetermined range. The concentration of the hole transport material and the concentration of the electron transport material can be prevented in a well-balanced manner, and the adhesion, the Martens hardness, and the elastic deformation ratio can be made preferred.

Further, in a third embodiment according to the present invention, a ratio of the molecular weight of the hole transport material to the molecular weight of the electron transport material is adjusted to a predetermined range. The concentration of the hole transport material and the concentration of the electron transport material can be prevented in a well-balanced manner, and the adhesion, the Martens hardness, and the elastic deformation ratio can be made preferred.

Hereinafter, the materials (the charge generation material, the hole transport material, the electron transport material, the binder resin, etc.) used in the photosensitive layer in contact with the protective layer (the outermost layer), for example, a single-layered photosensitive layer, will be described.

(Charge Generation Material)

Examples of the charge generation material used in the photosensitive layer include various photoconductive materials such as selenium and an alloy thereof, cadmium sulfide, and other inorganic photoconductive materials, and organic pigments such as a phthalocyanine pigment, an azo pigment, and a perylene pigment. Among them, organic pigments are preferred, a phthalocyanine pigment, or an azo pigment is more preferred, and a phthalocyanine pigment is even more preferred.

In particular, in the case of using a phthalocyanine pigment as the charge generation material, specifically, metal-free phthalocyanines and phthalocyanines to which a metal such as copper, indium, gallium, tin, titanium, zinc, vanadium, silicon, or germanium, or an oxide or halide of such a metal is coordinated can be used. Among them, X-form, τ-form metal-free phthalocyanines, A-form, B-form, and D-form titanyl phthalocyanines, vanadyl phthalocyanines, chloroindium phthalocyanines, chlorogallium phthalocyanines, hydroxygallium phthalocyanines, and the like, which have particularly high sensitivity, are suitable.

Among crystal forms of the titanyl phthalocyanine mentioned above, the A-form and the B-form are shown as I phase and II phase, respectively, by W. Heller et al. (Zeit. Kristallogr. 159 (1982) 173), of which the A-form is known as a stable form. The D-form is a crystal form characterized by showing a clear peak at a diffraction angle $2\theta\pm0.2°$ of 27.3° in powder X-ray diffraction using CuKα rays.

In the case of using an azo pigment as the charge generation material, various known bisazo pigments and trisazo pigments are suitably used.

The charge generation material may be used alone or in any combination of two or more kinds thereof in any ratio. Further, in the case of using two or more kinds of charge generation materials, as a method of mixing the charge generation materials used in combination, the respective charge generation materials may be mixed and used later, or may be mixed and used in charge generation material production and processing steps such as synthesis, pigmentization, and crystallization.

From the viewpoint of electrical characteristics, it is desirable that a particle diameter of the charge generation material is small. Specifically, the particle diameter is preferably 1 μm or less, and more preferably 0.5 μm or less. A lower limit of the particle diameter is 0.01 μm. Here, the particle diameter of the charge generation material means a particle diameter of the charge generation material in the state of being contained in the photosensitive layer.

Further, from the viewpoint of sensitivity, an amount of the charge generation material in the photosensitive layer in contact with the protective layer (the outermost layer), for example, a single-layered photosensitive layer, is preferably 0.1 mass % or more, and more preferably 0.5 mass % or more. From the viewpoint of the sensitivity and chargeability, the amount is preferably 50 mass % or less, and more preferably 20 mass % or less.

(Charge Transport Material)

The charge transport material is classified into a hole transport material mainly having hole transporting ability and an electron transport material mainly having electron transporting ability. The photosensitive layer in contact with the protective layer (the outermost layer) used in the present invention, for example, a single-layered photosensitive layer, contains both the hole transport material and the electron transport material.

[Hole Transport Material]

The hole transport material (HTM) can be selected from known materials and used. Examples thereof include electron-donating materials such as heterocyclic compounds such as a carbazole derivative, an indole derivative, an imidazole derivative, an oxazole derivative, a pyrazole derivative, a thiadiazole derivative, and a benzofuran derivative, an aniline derivative, a hydrazone derivative, an arylamine derivative, a stilbene derivative, a butadiene derivative, and an enamine derivative, and compounds each made of two or more of these compounds bonded together or polymers each having, in a main chain or a side chain thereof, a group constituted of any one of these compounds.

Among them, a carbazole derivative, an arylamine derivative, a stilbene derivative, a butadiene derivative, and an enamine derivative, and compounds each made of two or more of these compounds bonded together are preferred, and an arylamine derivative and an enamine derivative are more preferred.

In the first embodiment according to the present invention, as for the molecular weight of the hole transport material (HTM), the larger the molecular weight of the hole transport material, the lower the migration to the photosensitive layer surface, so that the hole transport material can be prevented from being concentrated on the photosensitive layer surface, and the deterioration of the adhesion between the photosensitive layer and the protective layer (the outermost layer) can be prevented. It is not preferred that the molecular weight of the hole transport material is too large since solubility in a solvent used in a coating liquid tends to decrease, and compatibility with the binder resin tends to decrease, resulting in precipitation.

From such a viewpoint, a molecular weight a of the hole transport material preferably satisfies the following formula (1), and more preferably satisfies the following formula (1').

$$600 \leq a \quad (1)$$

$$600 \leq a \leq 1200 \quad (1')$$

Thus, the molecular weight of the hole transport material is preferably 600 or more, more preferably 650 or more, even more preferably 700 or more, and particularly preferably 750 or more. On the other hand, the molecular weight is preferably 1200 or less, more preferably 1000 or less, and even more preferably 900 or less.

In second and third embodiments according to the present invention, from the viewpoint of the Martens hardness and the elastic deformation ratio, the photosensitive layer in contact with the protective layer (the outermost layer), for example, a single-layered photosensitive layer, further preferably satisfies the above formula (1), and more preferably satisfies the above formula (1').

That is, the molecular weight a of the hole transport material is preferably 600 or more, more preferably 650 or more, even more preferably 700 or more, and particularly preferably 750 or more. On the other hand, the molecular weight a is preferably 1200 or less, more preferably 1000 or less, and even more preferably 900 or less.

The hole transport material may be used alone or in any combination of two or more kinds thereof in any ratio. In the case of using two or more kinds of the hole transport materials, among the two or more kinds of the hole transport materials, the hole transport material having the largest content (part by mass) in the photosensitive layer more preferably has a molecular weight of 600 or more.

Preferred structures of the hole transport material are exemplified below.

HTM2

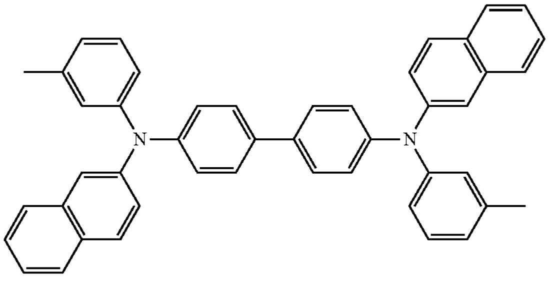

-continued
HTM12
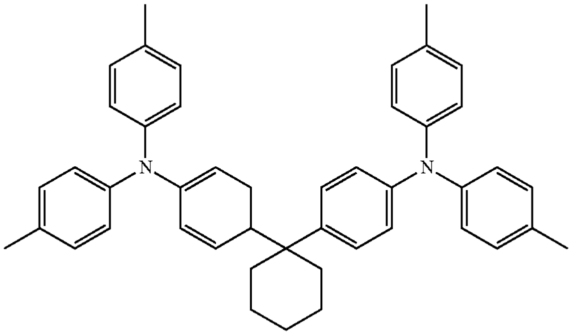
HTM30
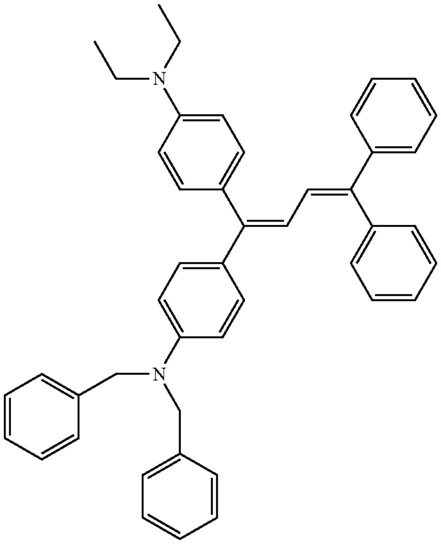
HTM31
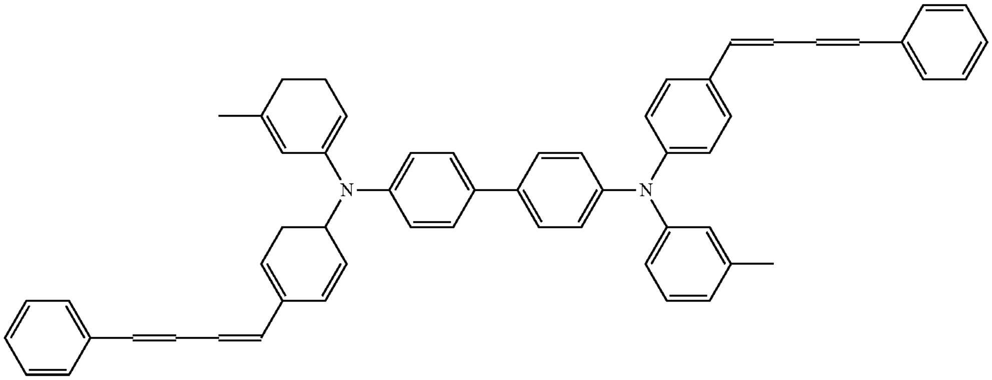
HTM32
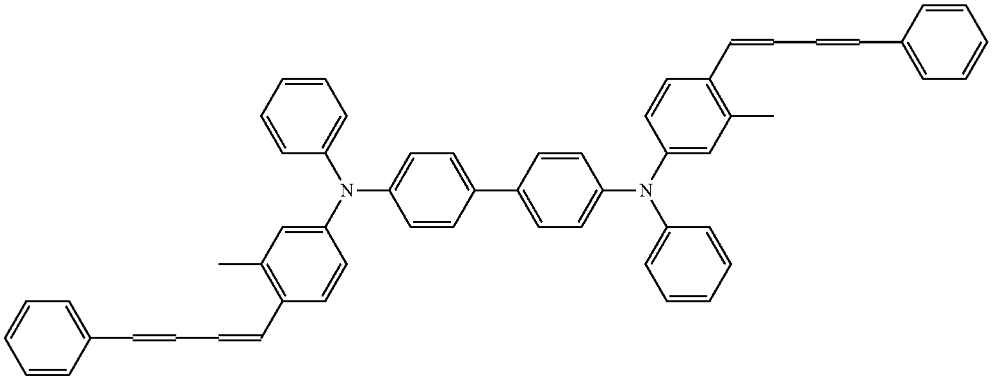

-continued
HTM33
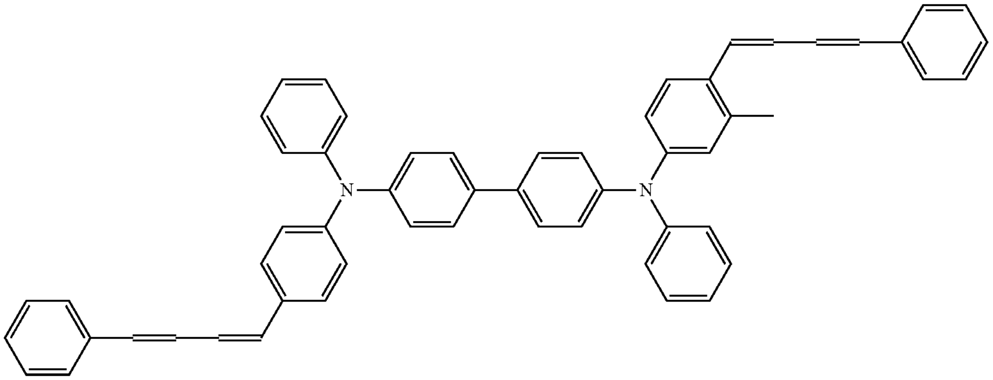
HTM34
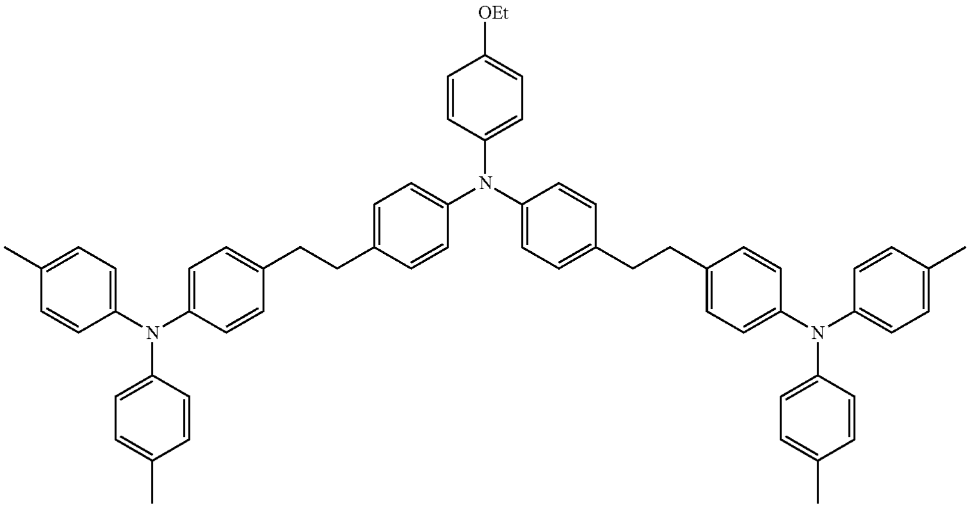
HTM35
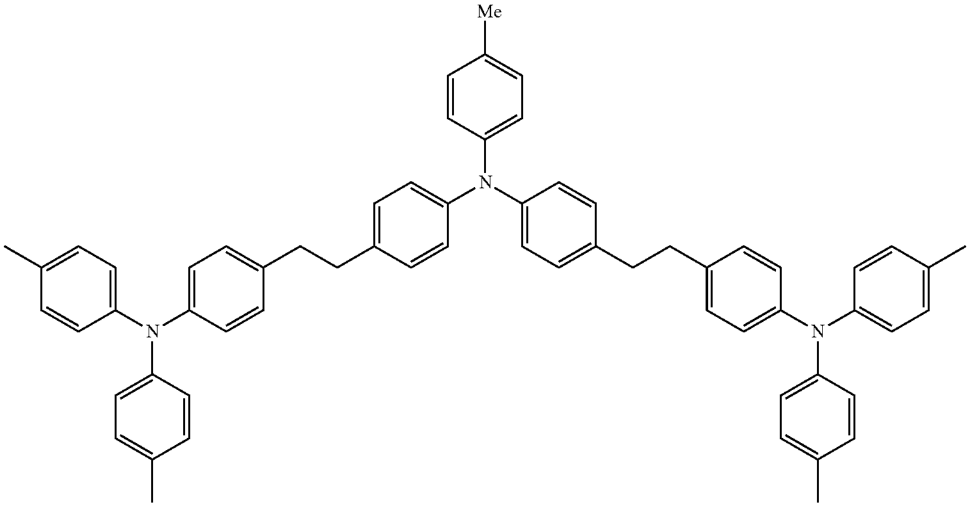

-continued
HTM36
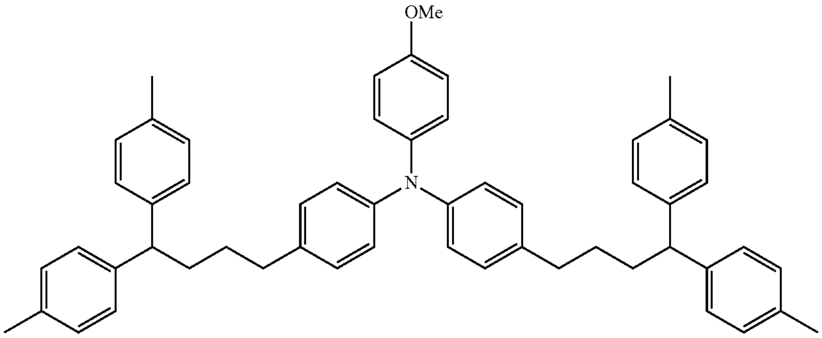
HTM38
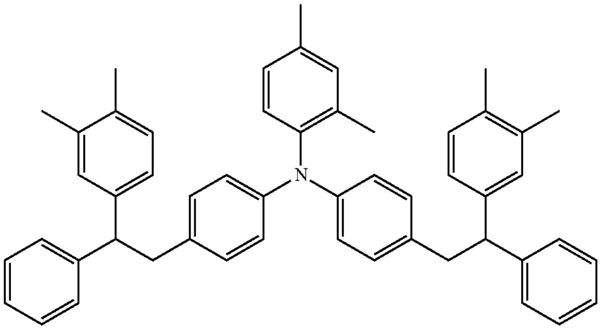
HTM39
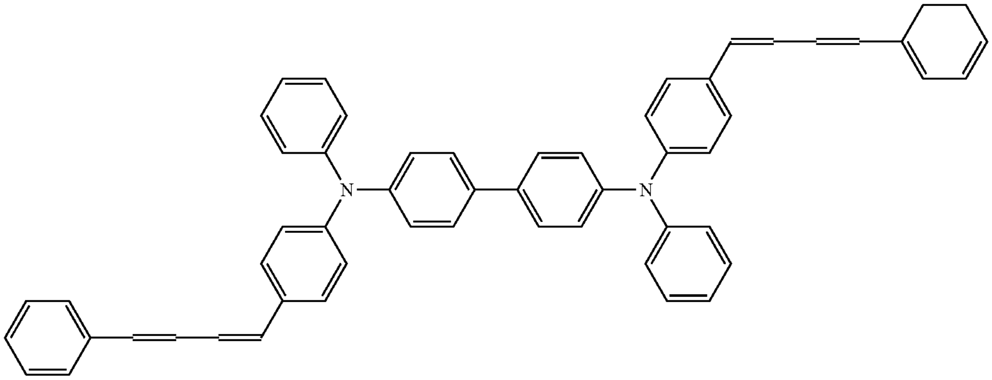
HTM40
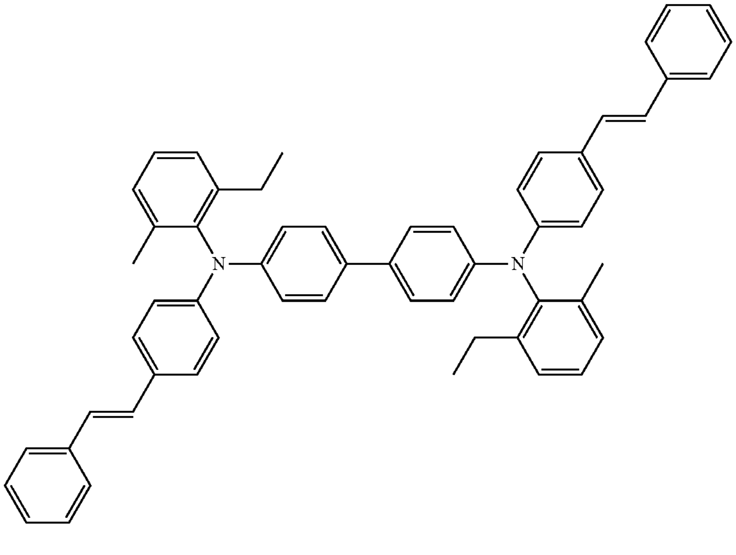

-continued
HTM41
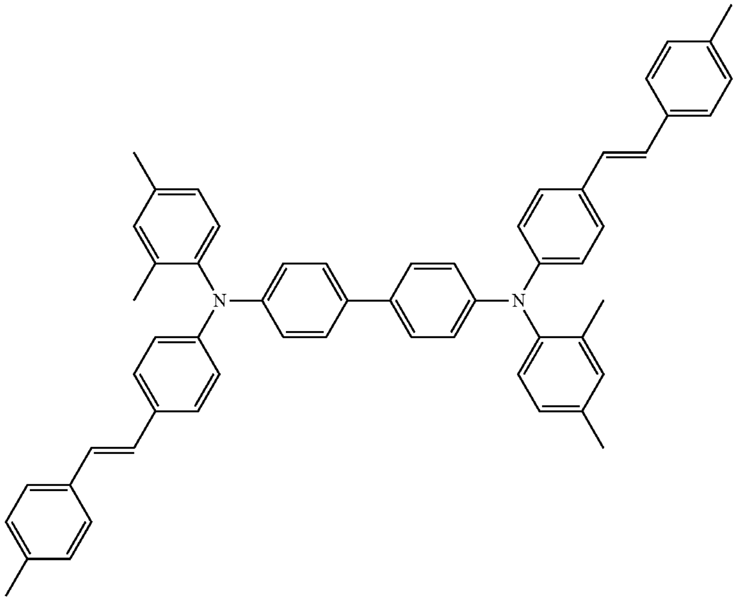
HTM42
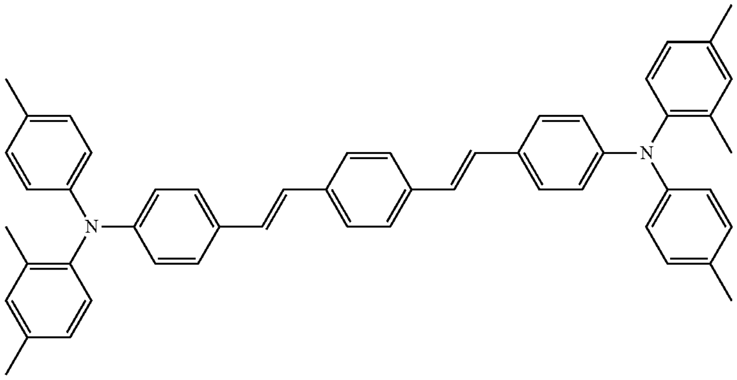
HTM43
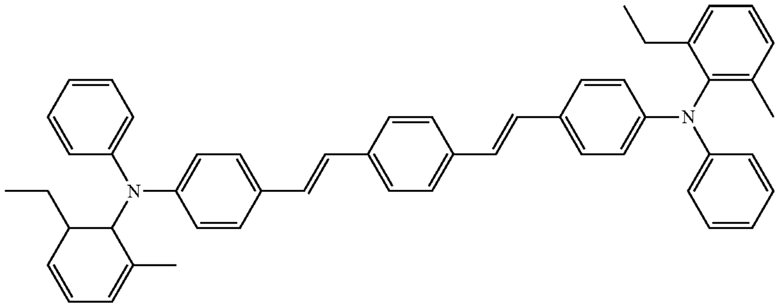
HTM44
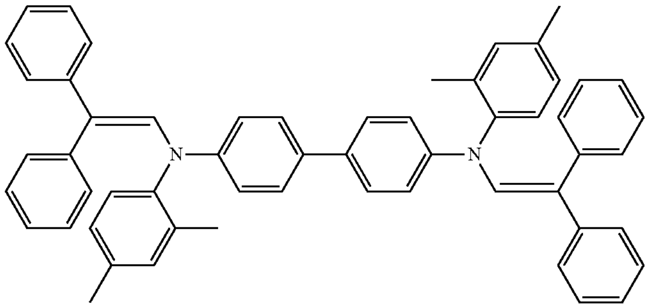

-continued

HTM46

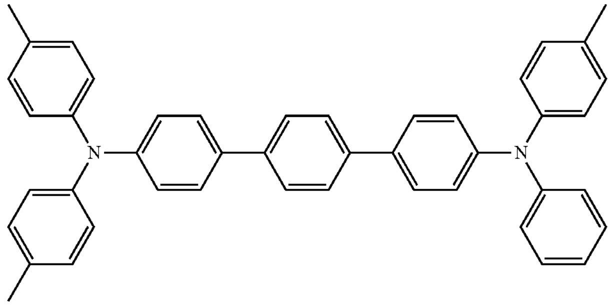

HTM47

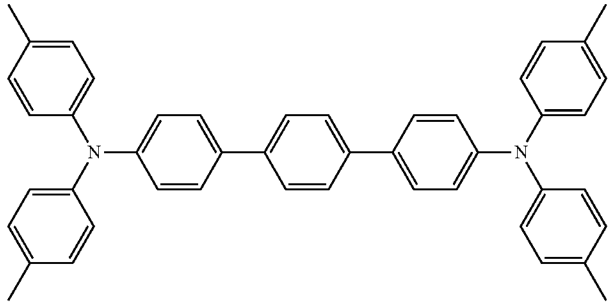

HTM48

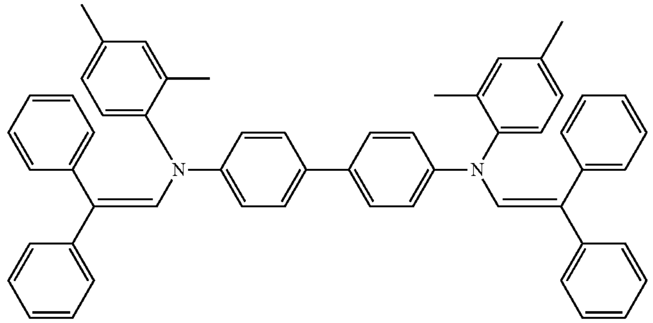

Among the hole transport materials described above, from the viewpoint of the electrical characteristics, preferred are HTM12, HTM31, HTM32, HTM33, HTM34, HTM35, HTM36, HTM38, HTM39, HTM40, HTM41, HTM42, HTM43, and HTM48, more preferred are HTM31, HTM32, HTM33, HTM34, HTM35, HTM36, HTM38, HTM39, HTM40, HTM41, HTM42, HTM43, and HTM48, and even more preferred are HTM39, HTM40, HTM41, HTM42, HTM43, and HTM48.

Among the hole transport materials described above, from the viewpoint of further enhancing the adhesion between the photosensitive layer and the protective layer (the outermost layer), the hole transport material preferably has a structure in which at least one aromatic group bonded to a nitrogen (N) atom has a substituent in at least one ortho-position, and among them, more preferably has a structure in which at least one aromatic group bonded to a nitrogen (N) atom has substituents in two ortho-positions. It is considered that when the hole transport material has the above-described structure, the aromatic group sterically repels other substituents bonded to the nitrogen atom, and takes a steric configuration rotated with respect to a plane formed by the nitrogen atom and the other substituents bonded to the nitrogen atom. It is presumed that with such a steric configuration, the aromatic group exerts an anchor effect on the binder resin, so that the hole transport material is less likely to be concentrated on the photosensitive layer surface.

Examples of the aromatic group include, in addition to a benzene ring, a naphthyl group, an anthracene group, a phenanthrene group, a biphenyl group, a pyrene group, and a carbazole group. Among them, from the viewpoint of solubility, a benzene ring, a naphthyl group, or a biphenyl group is preferred, and a benzene ring is more preferred.

Examples of the substituent in the ortho-position include a methyl group, an ethyl group, an n-propyl group, an i-propyl group, an n-butyl group, a sec-butyl group, an i-butyl group, a tert-butyl group, an n-pentyl group, an isopentyl group, a sec-pentyl group, a neopentyl group, a 1-methylbutyl group, a 2-methylbutyl group, a 1,1-dimethylpropyl group, a 1,2-dimethylpropyl group, a vinyl group, a 1-propenyl group, a 2-propenyl group, an isopropenyl group, a 1-butenyl group, a 2-butenyl group, a 3-butenyl group, a 1-pentenyl group, a 2-pentenyl group, a 3-pentenyl group, a 4-pentenyl group, an ethynyl group, a 1-propynyl group, a 2-propynyl group, a 1-butynyl group, a 2-butynyl group, a 3-butynyl group, a 1-pentynyl group, a 2-pentynyl group, a 3-pentynyl group, and a 4-pentynyl group. Among them, from the viewpoint of easy introduction of the substituent, a methyl group, an ethyl group, an n-propyl group, an i-propyl group, an n-butyl group, a sec-butyl group, or an i-butyl group is preferred, and a methyl group, an ethyl group, an n-propyl group, or an i-propyl group is more preferred.

From such a viewpoint, among the hole transport materials described above, HTM48, HTM42, HTM40, HTM43, or HTM41 is preferred, and among them, HTM40 or HTM43 is more preferred.

The hole transport material having a molecular weight of 600 or more may be used in combination with hole transport materials having a molecular weight outside the above range (referred to as "other hole transport materials").

In this case, an amount of the hole transport material having a molecular weight of 600 or more is preferably larger than an amount of the other hole transport materials, and among them, the amount of the other hole transport materials is preferably 80 parts by mass or less, more preferably 60 parts by mass or less, and even more preferably 40 parts by mass or less with respect to 100 parts by mass of the hole transport material having a molecular weight of 600 or more.

Hole transport materials having the following structure can be exemplified as the other hole transport materials. The present invention is not limited thereto.

HTM1

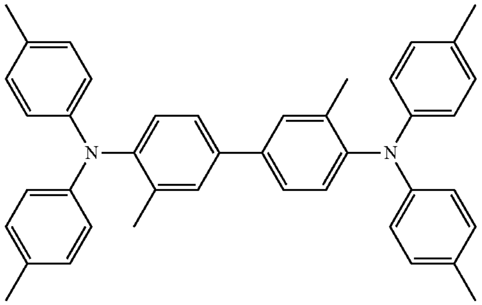

HTM3

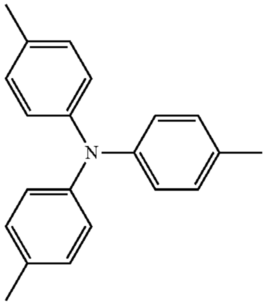

HTM4

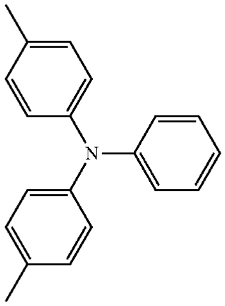

-continued

HTM5

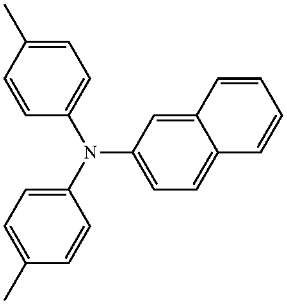

HTM6

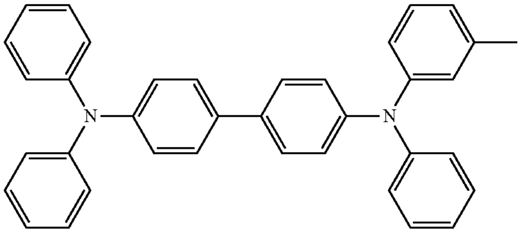

HTM7

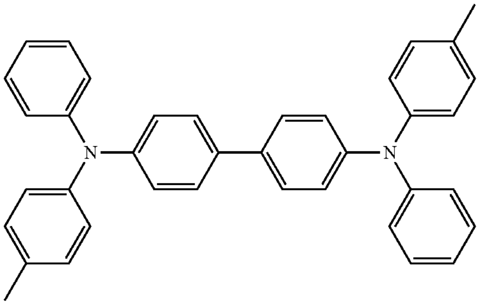

HTM8

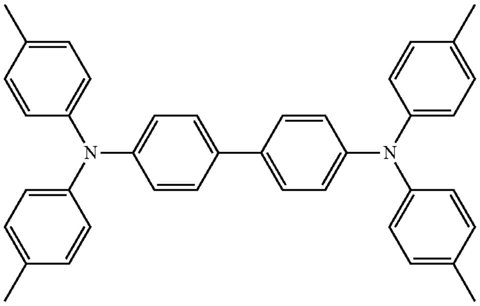

HTM9

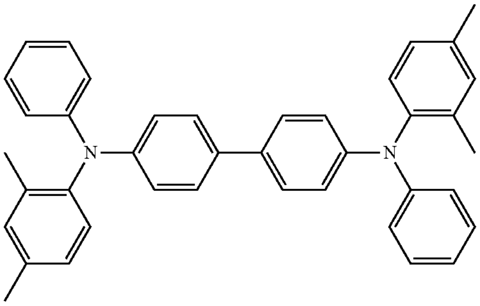

-continued
HTM10
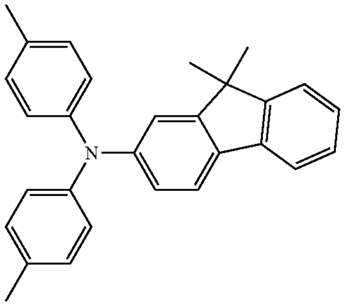
HTM11
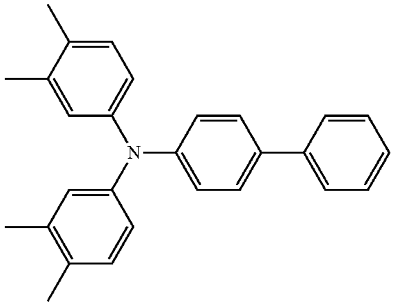
HTM13
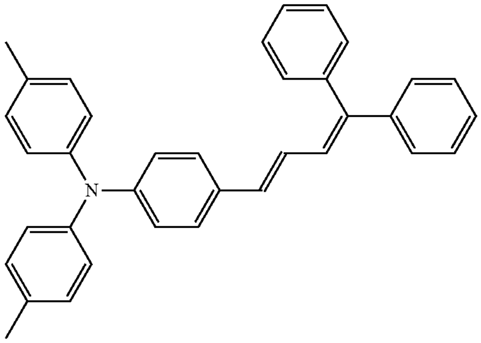
HTM14
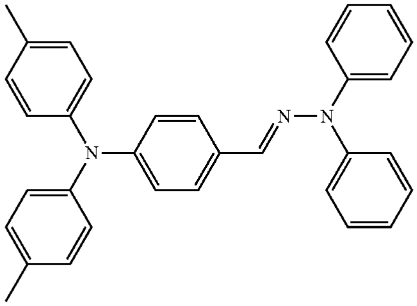
HTM15
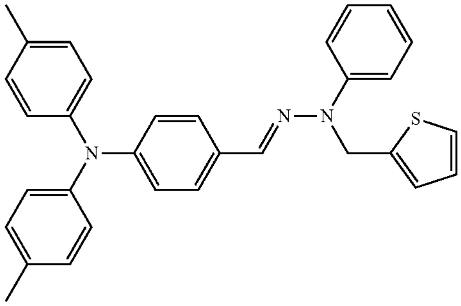
-continued
HTM16
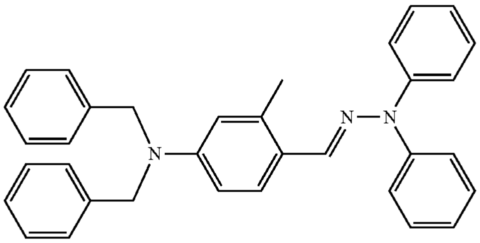
HTM17
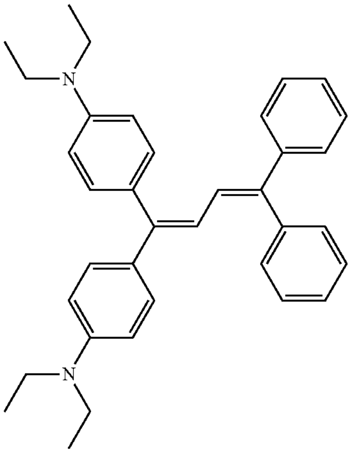
HTM18
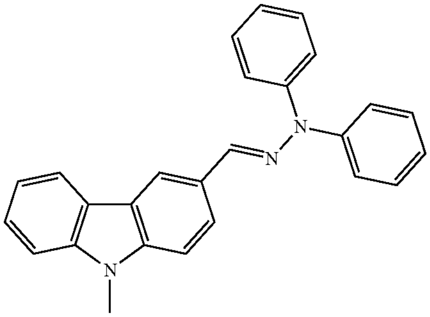
HTM19
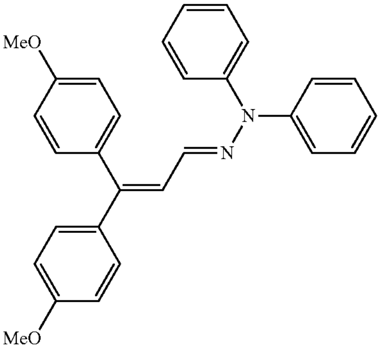
HTM20
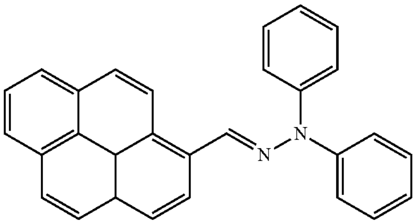

-continued

HTM21

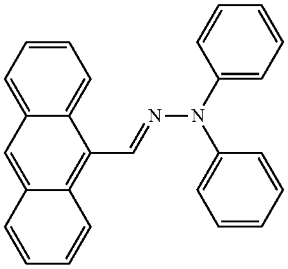

HTM22

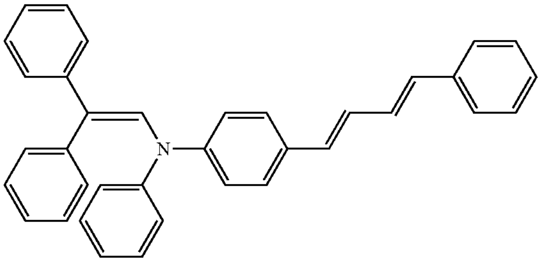

HTM23

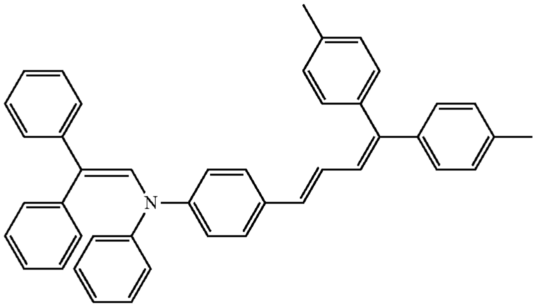

HTM24

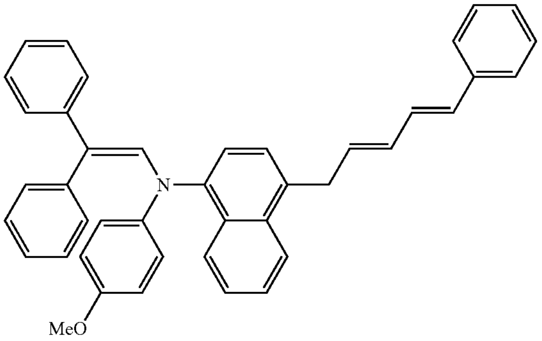

HTM37

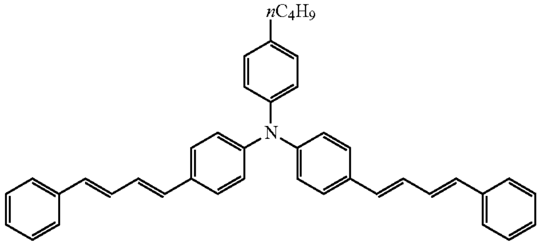

-continued

HTM45

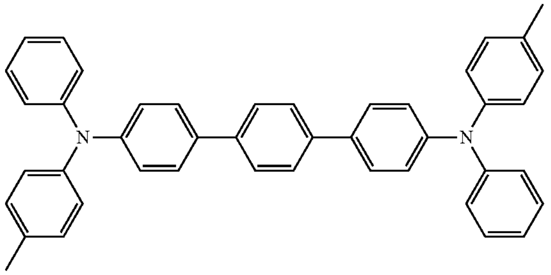

[Electron Transport Material]

The electron transport material (ETM) can be selected from known materials and used. Examples thereof include electron-attracting materials such as aromatic nitro compounds such as 2,4,7-trinitrofluorenone, cyano compounds such as tetracyanoquinodimethane, and quinone compounds such as diphenoquinone, known cyclic ketone compounds or perylene pigments (perylene derivatives).

In the first embodiment according to the present invention, as for the molecular weight of the electron transport material (ETM), the larger the molecular weight of the electron transport material, the lower the migration to the surface, so that the electron transport material can be prevented from being concentrated on the photosensitive layer surface and further from migrating to an outermost layer side. Therefore, the electron transport material can be prevented from trapping a radical generated by the curing reaction of the protective layer (the outermost layer) and inhibiting the curing reaction. Therefore, a decrease in Martens hardness of the photoreceptor surface and a decrease in elastic deformation ratio of the photoreceptor surface can be prevented. It is not preferred that the molecular weight of the electron transport material is too large since the solubility in the solvent used in the coating liquid tends to decrease, and the compatibility with the binder resin tends to decrease, resulting in precipitation.

From such a viewpoint, a molecular weight b of the electron transport material preferably satisfies the following formula (2), and more preferably satisfies the following formula (2').

$$400 \leq b \quad (2)$$

$$400 \leq b \leq 1000 \quad (2')$$

Thus, the molecular weight of the electron transport material is preferably 400 or more, more preferably 410 or more, and even more preferably 420 or more. On the other hand, the molecular weight is preferably 1000 or less, more preferably 800 or less, and even more preferably 600 or less.

In the second and third embodiments according to the present invention, from the viewpoint of the Martens hardness and the elastic deformation ratio, the photosensitive layer in contact with the protective layer (the outermost layer), for example, a single-layered photosensitive layer, further preferably satisfies the above formula (2), and more preferably satisfies the above formula (2').

Thus, the molecular weight b of the electron transport material is preferably 400 or more, more preferably 410 or more, and even more preferably 420 or more. On the other hand, the molecular weight b is preferably 1000 or less, more preferably 800 or less, and even more preferably 600 or less.

In the first and second embodiments according to the present invention, as for a relationship between the molecular weight of the hole transport material and the molecular weight of the electron transport material, the molecular weight a of the hole transport material is preferably larger than the molecular weight b of the electron transport material from the viewpoint of the Martens hardness, the elastic deformation ratio, and the adhesion between the photosensitive layer and the protective layer (the outermost layer).

That is, a ratio (a/b) of the molecular weight a of the hole transport material to the molecular weight b of the electron transport material is 1.00 or more, preferably 1.40 or more, more preferably 1.50 or more, even more preferably 1.60 or more, still more preferably 1.70 or more, and particularly preferably 1.80 or more. On the other hand, from the viewpoint of the electrical characteristics, the ratio (a/b) is preferably 3.00 or less, more preferably 2.00 or less, even more preferably 1.90 or less, and still more preferably 1.85 or less.

In the third embodiment according to the present invention, when the ratio (a/b) of the molecular weight a of the hole transport material to the molecular weight b of the electron transport material is 1.40 or more and 1.90 or less, the concentration of the hole transport material and the concentration of the electron transport material are prevented in a well-balanced manner, and the adhesion, the Martens hardness, and the elastic deformation ratio can be made preferred.

When the a/b is 1.40 or more, the molecular weight of the hole transport material is adjusted to be relatively large, and the migration of the hole transport material to the photosensitive layer surface side is reduced, and the adhesion is good. In addition, when the migration of the hole transport material to the photosensitive layer surface side is reduced, a movement of the electron transport material to the photosensitive layer surface side is inhibited accordingly, so that the migration of the electron transport material to the photosensitive layer surface side is also reduced, and the Martens hardness and the elastic deformation ratio are also improved. Among them, the a/b is preferably 1.50 or more, more preferably 1.60 or more, even more preferably 1.70 or more, and particularly preferably 1.80 or more.

When the a/b is 1.90 or less, the molecular weight of the electron transport material is adjusted to be relatively large, and the migration of the electron transport material to the photosensitive layer surface side is reduced, so that the Martens hardness and the elastic deformation ratio are improved. In addition, when the migration of the electron transport material to the photosensitive layer surface side is reduced, the movement of the hole transport material to the photosensitive layer surface side is inhibited accordingly, so that the migration of the hole transport material to the photosensitive layer surface side is also reduced, and the adhesion is improved. Therefore, the a/b is preferably 1.90 or less, and more preferably 1.85 or less.

The electron transport material may be used alone or in any combination of two or more kinds thereof in any ratio. In the case of using two or more kinds of the electron transport materials, among the two or more kinds of the electron transport materials, the electron transport material having the largest content (part by mass) in the photosensitive layer more preferably has a molecular weight of 400 or more.

A compound represented by the following formula (6) can be exemplified as a particularly preferred compound as the electron transport material.

Formula (6)

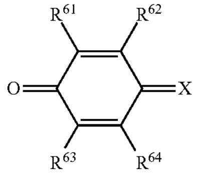

In the formula (6), $R^{61}$ to $R^{64}$ each independently represent a hydrogen atom, an alkyl group having 1 or more and 20 or less carbon atoms which may be substituted, or an alkenyl group having 2 or more and 20 or less carbon atoms which may be substituted, and $R^{61}$ and $R^{62}$ or $R^{63}$ and $R^{64}$ may be bonded to each other to form a cyclic structure. X represents an organic residue having a molecular weight of 120 or more and 250 or less.

$R^{61}$ to $R^{64}$ each independently represent a hydrogen atom, an alkyl group having 1 or more and 20 or less carbon atoms which may be substituted, or an alkenyl group having 2 or more and 20 or less carbon atoms.

Examples of the alkyl group having 1 or more and 20 or less carbon atoms which may be substituted include a linear alkyl group, a branched alkyl group, and a cyclic alkyl group, and a linear alkyl group or a branched alkyl group is preferred from the viewpoint of electron transporting capability. The number of carbon atoms in the alkyl group is generally 1 or more, and preferably 4 or more, and is generally 20 or less, preferably 15 or less from the viewpoint of versatility of raw materials, more preferably 10 or less, and even more preferably 5 or less from the viewpoint of handleability at the time of production. Specific examples thereof include a methyl group, an ethyl group, a hexyl group, an iso-propyl group, a tert-butyl group, a tert-amyl group, a cyclohexyl group, and a cyclopentyl group. Among them, a methyl group, a tert-butyl group, or a tert-amyl group is preferred, and a tert-butyl group or a tert-amyl group is more preferred from the viewpoint of solubility in an organic solvent used for a coating liquid.

Examples of the alkenyl group having 2 or more and 20 or less carbon atoms which may be substituted include a linear alkenyl group, a branched alkenyl group, and a cyclic alkenyl group. The number of carbon atoms in the alkenyl group is generally 2 or more, and preferably 4 or more, and is generally 20 or less, and preferably 10 or less from the viewpoint of light attenuation characteristics of the photoreceptor. Specific examples thereof include an ethenyl group, a 2-methyl-1-propenyl group, and a cyclohexenyl group.

In the substituents $R^{61}$ to $R^{64}$, $R^{61}$ and $R^{62}$ or $R^{63}$ and $R^{64}$ may be bonded to each other to form a cyclic structure. From the viewpoint of electron mobility, when both $R^{61}$ and $R^{62}$ are an alkenyl group, they are preferably bonded to each other to form an aromatic ring, and it is more preferable that both $R^{61}$ and $R^{62}$ are an ethenyl group and are bonded to each other to have a benzene ring structure.

In the formula (6), X represents an organic residue having a molecular weight of 120 or more and 250 or less, and from the viewpoint of light attenuation characteristics of the photoreceptor, the compound represented by the formula (6) is preferably a compound represented by any one of the following formulae (7) to (10).

Formula (7)

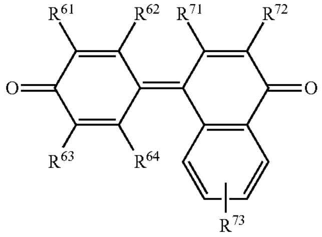

In the formula (7), $R^{71}$ to $R^{73}$ each independently represent a hydrogen atom, a halogen atom, or an alkyl group having 1 or more and 6 or less carbon atoms.

Formula (8)

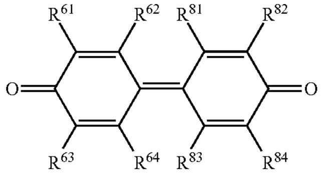

In the formula (8), $R^{81}$ to $R^{84}$ each independently represent a hydrogen atom, a halogen atom, or an alkyl group having 1 or more and 6 or less carbon atoms.

Formula (9)

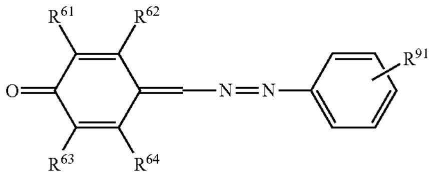

In the formula (9), $R^{91}$ represents a hydrogen atom, an alkyl group having 1 or more and 6 or less carbon atoms, or a halogen atom.

Formula (10)

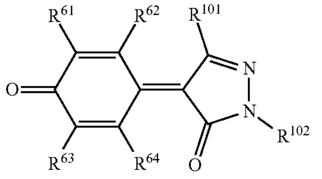

In the formula (10), $R^{101}$ and $R^{102}$ each independently represent a hydrogen atom, a halogen atom, an alkyl group having 1 or more and 6 or less carbon atoms, or an aryl group having 6 or more and 12 or less carbon atoms.

Examples of the alkyl group having 1 or more and 6 or less carbon atoms in $R^{71}$ to $R^{102}$ include a linear alkyl group, a branched alkyl group, and a cyclic alkyl group. The number of carbon atoms in the alkyl group is generally 1 or more and generally 6 or less. Specific examples thereof include a methyl group, an ethyl group, a hexyl group, an iso-propyl group, a tert-butyl group, a tert-amyl group, and a cyclohexyl group. Among them, a methyl group, a tert-butyl group, or a tert-amyl group is preferred from the viewpoint of the electron transporting capability.

Examples of the halogen atom include fluorine, chlorine, bromine, and iodine, and chlorine is preferred from the viewpoint of the electron transporting capability.

The number of carbon atoms in the aryl group having 6 or more and 12 or less carbon atoms is generally 6 or more and generally 12 or less. Specific examples thereof include a phenyl group and a naphthyl group, and a phenyl group is preferred from the viewpoint of film properties of the photosensitive layer. The aryl group may be further substituted.

Among the formulae (7) to (10), the formula (6) is preferably the formula (7) or the formula (8), and more preferably the formula (7) from the viewpoint of image quality stability when repeatedly forming images. In addition, the compound represented by the formula (6) may be used alone or in combination with the compounds represented by the formula (6) having different structures, and may also be used in combination with other electron transport materials.

Preferred structures of the electron transport material are exemplified below.

ET-2

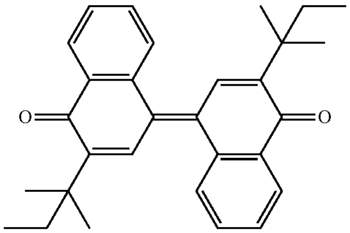

ET-5

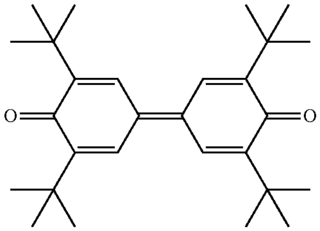

ET-9

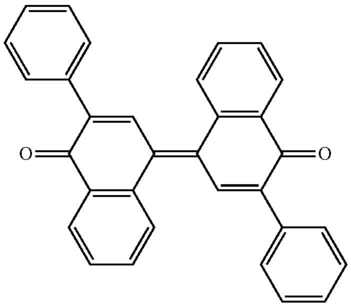

ET-13

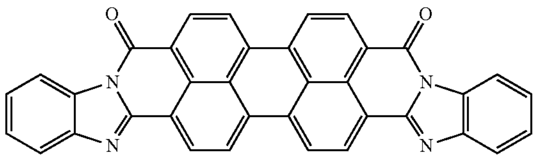

-continued

ET-14

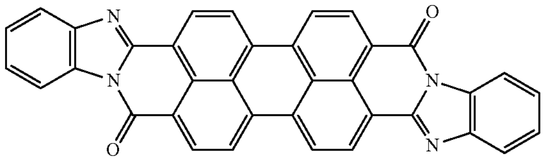

ET-15

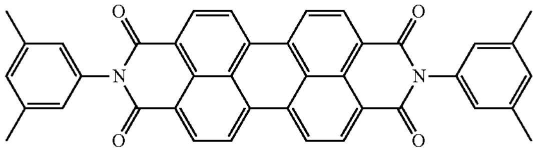

ET-16

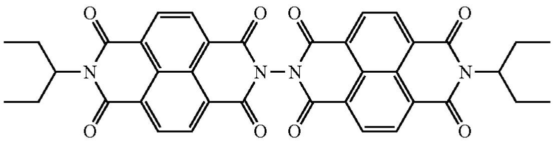

ET-17

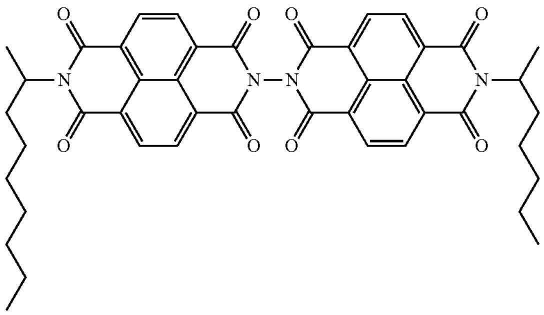

Among the above electron transport materials, ET-2, ET-5, ET-15, ET-16 or ET-17 is preferred, and ET-2 or ET-5 is more preferred, and ET-2 is even more preferred, from the viewpoint of the electrical characteristics.

On the other hand, among the above electron transport materials, ET-2, ET-5, ET-9, ET-13, ET-14, ET-15, ET-16 or ET-17 is preferred, and ET-2 or ET-5 is more preferred, from the viewpoint of preventing a decrease in Martens hardness of the photoreceptor surface and preventing a decrease in elastic deformation ratio of the photoreceptor surface.

The preferred electron transport materials exemplified above may be used in combination with the other electron transport materials.

In this case, an amount of the preferred electron transport material is preferably larger than an amount of the other electron transport materials, and among them, the amount of the other electron transport materials is preferably 80 parts by mass or less, more preferably 60 parts by mass or less, and even more preferably 40 parts by mass or less with respect to 100 parts by mass of the electron transport material.

Examples of the other electron transport materials include electron transport materials having the following structures. The present invention is not limited thereto.

ET-1

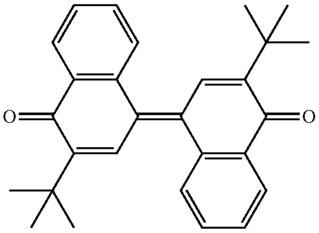

ET-3

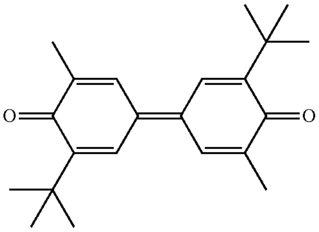

ET-4

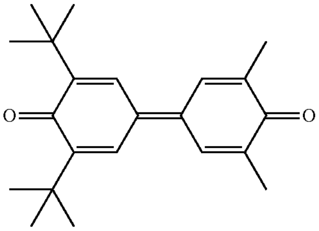

ET-6

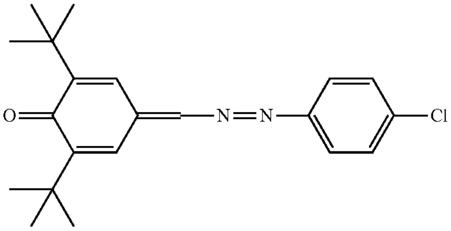

ET-7

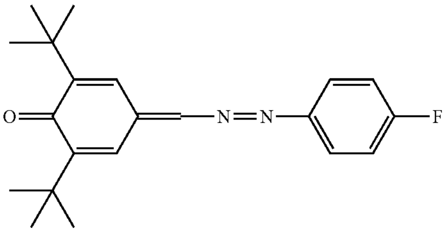

ET-8

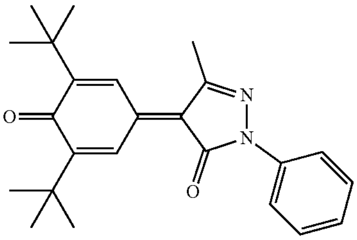

-continued

ET-10

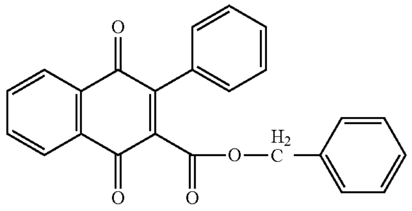

ET-11

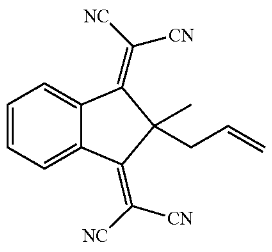

ET-12

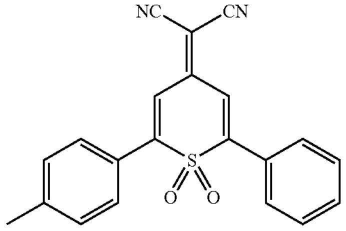

[Contents of Hole Transport Material and Electron Transport Material]

In the first, second, and third embodiments according to the present invention, it is preferred that a total amount of a substance amount (mol) of the hole transport material and a substance amount (mol) of the electron transport material contained in the photosensitive layer is adjusted such that the photosensitive layer in contact with the protective layer (the outermost layer), for example, a single-layered photosensitive layer, satisfies the formula (3), since an absolute amount of the charge transport material necessary for charge transport in the photosensitive layer can be ensured.

$$0.15 \leq (A/a)+(B/b) \quad (3)$$

In the formula (3) and formulae (4) and (5) to be described later, A represents a content (part by mass) of the hole transport material and B represents a content (part by mass) of the electron transport material when a content of the binder resin contained in the photosensitive layer in contact with the protective layer (the outermost layer), for example, a single-layered photosensitive layer, is 100 (parts by mass), a represents the molecular weight of the hole transport material, and b represents the molecular weight of the electron transport material.

The (A/a) or (B/b) is obtained by dividing the content of the hole transport material or the electron transport material by the molecular weight, and represents a substance amount, i.e., the number of molecules, i.e., a molar amount.

From the viewpoint of ensuring the absolute amount of the charge transport material necessary for charge transport in the photosensitive layer, the (A/a)+(B/b) is preferably 0.15 or more, more preferably 0.17 or more, and even more preferably 0.20 or more. On the other hand, the (A/a)+(B/b) is preferably 0.60 or less, more preferably 0.40 or less, and even more preferably 0.30 or less.

In the first, second and third embodiments according to the present invention, the photosensitive layer in contact with the protective layer (the outermost layer), for example, a single-layered photosensitive layer, further preferably satisfies the formula (4).

$$0.80 \leq A/B \leq 3.00 \quad (4)$$

The "A/B" in the formula (4) means a content ratio of the hole transport material to the electron transport material contained in the photosensitive layer. The "A/B" is preferably 0.80 or more from the viewpoint of obtaining a good electron transporting property, and the "A/B" is preferably 3.00 or less from the viewpoint of obtaining a good hole transporting property.

From such a viewpoint, the "A/B" is preferably 0.80 or more, more preferably 1.00 or more, and even more preferably 1.10 or more. On the other hand, the "A/B" is preferably 3.00 or less, more preferably 2.00 or less, and even more preferably 1.80 or less.

In the first and third embodiments according to the present invention, from the viewpoint of the Martens hardness, the elastic deformation ratio, and the adhesion, the photosensitive layer in contact with the protective layer (the outermost layer), for example, a single-layered photosensitive layer, further preferably satisfies the formula (5).

$$1.20 \leq (B/b)/(A/a) \leq 1.60 \quad (5)$$

That is, the (B/b)/(A/a) is preferably 1.20 or more, more preferably 1.40 or more, and even more preferably 1.50 or more. On the other hand, the (B/b)/(A/a) is preferably 1.60 or less, more preferably 1.58 or less, and even more preferably 1.55 or less.

In the second embodiment according to the present invention, when a ratio of the substance amount (mol) of the hole transport material to the substance amount (mol) of the electron transport material contained in the photosensitive layer is adjusted such that the photosensitive layer in contact with the protective layer (the outermost layer), for example, a single-layered photosensitive layer, satisfies the formula (5), the concentration of the hole transport material and the concentration of the electron transport material are prevented in a well-balanced manner, and the Martens hardness, the elastic deformation ratio, and the adhesion can be improved.

As described above, from the viewpoint of preventing the concentration of the hole transport material and the concentration of the electron transport material in a well-balanced manner and making both the adhesion, and the Martens hardness and the elastic deformation ratio more preferred, the (B/b)/(A/a) is preferably 1.20 or more, more preferably 1.40 or more, and even more preferably 1.50 or more. On the other hand, the (B/b)/(A/a) is preferably 1.60 or less, more preferably 1.58 or less, and even more preferably 1.55 or less.

It is considered that when both the hole transport material and the electron transport material are contained in the photosensitive layer, electron transfer occurs from the hole transport material to the electron transport material, resulting in a positively charged hole transport material and a negatively charged electron transport material, which form a charge transfer complex. It is presumed that when a charge transfer complex is formed, an electrostatic attraction acts between the positively charged hole transport material and the negatively charged electron transport material, so that both materials are less likely to be concentrated on the photosensitive layer surface.

When the (B/b)/(A/a) is 1.20 or more, the number of molecules of the electron transport material is not too small with respect to that of the hole transport material, and an amount of the hole transport material which cannot form the charge transfer complex can be reduced, so that the concentration of the hole transport material on the photosensitive layer surface can be more effectively prevented.

When the (B/b)/(A/a) is 1.60 or less, the number of molecules of the hole transport material is not too small with respect to that of the electron transport material, and an amount of the electron transport material which cannot form the charge transfer complex can be reduced, so that the concentration of the electron transport material on the photosensitive layer surface can be more effectively prevented.

That is, it is considered that when the (B/b)/(A/a) is 1.20 or more and 1.60 or less, the hole transport material and the electron transport material can sufficiently form the charge transfer complex.

(Binder Resin)

Next, the binder resin used in the photosensitive layer will be described. Examples of the binder resin used in the photosensitive layer include: a vinyl polymer such as polymethyl methacrylate, polystyrene, and polyvinyl chloride, or a copolymer thereof; a butadiene resin; a styrene resin; a vinyl acetate resin; a vinyl chloride resin, an acrylate ester resin; a methacrylate ester resin; a vinyl alcohol resin; polymers and copolymers of vinyl compounds such as ethyl vinyl ether; a polyvinyl butyral resin; a polyvinyl formal resin; a partially modified polyvinyl acetal resin; a polyarylate resin; a polyamide resin; a polyurethane resin; a cellulose ester resin; a silicone-alkyd resin; a poly-N-vinylcarbazole resin; a polycarbonate resin; a polyester resin; a polyester carbonate resin; a polysulfone resin; a polyimide resin; a phenoxy resin; an epoxy resin; a silicone resin; and a partially crosslinked cured product thereof. In addition, the above resin may be modified with a silicon reagent or the like. These may be used alone or in any combination of two or more kinds thereof in any ratio.

In particular, it is preferred to contain one kind or two or more kinds of polymers obtained by interfacial polymerization as the binder resin.

As the binder resin obtained by interfacial polymerization, a polycarbonate resin or a polyester resin is preferred, and a polycarbonate resin or a polyarylate resin is particularly preferred. In particular, a polymer using an aromatic diol as a raw material is preferred, and examples of a preferred aromatic diol compound include a compound represented by the following formula (11).

Formula (11)

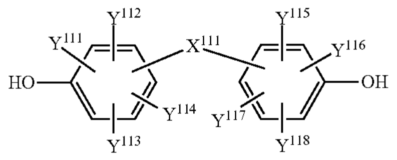

In the above formula (11), $X^{111}$ represents a single bond or a linking group represented by any of the following formulae.

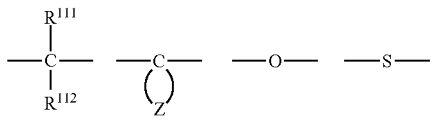

-continued

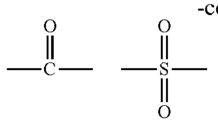

In the above formulae, $R^{111}$ and $R^{112}$ each independently represent a hydrogen atom, an alkyl group having 1 to 20 carbon atoms, an aryl group which may be substituted, or a halogenated alkyl group. Z represents a substituted or unsubstituted carbocyclic ring having 4 to 20 carbon atoms.

In the formula (11), $Y^{111}$ to $Y^{118}$ each independently represent a hydrogen atom, a halogen atom, an alkyl group having 1 to 20 carbon atoms, an aryl group which may be substituted, or a halogenated alkyl group.

(Other Materials)

In addition to the materials described above, the photosensitive layer may contain an additive agent such as an antioxidant, a plasticizer, an ultraviolet absorber, an electron-attracting compound, a leveling agent, and a visible light shielding agent, which are well known, in order to improve film formability, flexibility, coatability, contamination resistance, gas resistance, light resistance, and the like. If necessary, the photosensitive layer may contain various additives such as a sensitizer, a dye, a pigment (except for the charge generation material, the hole transport material, and the electron transport material), and a surfactant. Examples of the surfactant include a silicone oil and a fluorine-based compound. In the present invention, these may be used alone or in any combination of two or more kinds thereof in any ratio as appropriate.

For the purpose of reducing frictional resistance of the photosensitive layer surface, the photosensitive layer may contain a fluorine-based resin, a silicone resin, or the like, or may contain particles of these resins or particles of an inorganic compound such as aluminum oxide.

(Antioxidant)

The antioxidant is one kind of stabilizer used for preventing oxidation of the electrophotographic photoreceptor according to the present invention.

Any antioxidant may be used as long as it functions as a radical scavenger, and specific examples thereof include a phenol derivative, an amine compound, a phosphonate ester, a sulfur compound, a vitamin, and a vitamin derivative.

An amount of the antioxidant to be used is not particularly limited, and is 0.1 part by mass or more, and preferably 1 part by mass or more, per 100 parts by mass of the binder resin in the photosensitive layer. In order to obtain good electrical characteristics and printing durability, the amount is preferably 25 parts by mass or less, and more preferably 20 parts by mass or less.

(Electron-attracting Compound)

Further, the photosensitive layer may contain the electron-attracting compound.

Specific examples of the electron-attracting compound include a sulfonic acid ester compound, a carboxylic acid ester compound, an organic cyano compound, a nitro compound, and an aromatic halogen derivative. A sulfonic acid ester compound or an organic cyano compound is preferred, and a sulfonic acid ester compound is particularly preferred. The electron-attracting compound may be used alone or in any combination of two or more kinds thereof in any ratio.

An amount of the electron-attracting compound to be used in the electrophotographic photoreceptor according to the invention is not particularly limited. When the electron-attracting compound is used in the photosensitive layer, the amount is preferably 0.01 part by mass or more, and more preferably 0.05 part by mass or more, per 100 parts by mass of the binder resin contained in the photosensitive layer. In order to obtain good electrical characteristics, in general, the amount is preferably 50 parts by mass or less, more preferably 40 parts by mass or less, and even more preferably 30 parts by mass or less.

[Method for Forming Photosensitive Layer]

Next, a method for forming the photosensitive layer in contact with the protective layer (the outermost layer), for example, a single-layered photosensitive layer, will be described. The method for forming the photosensitive layer according to the present invention is not particularly limited.

For example, the photosensitive layer can be formed by dispersing the charge generation material in a coating liquid obtained by dissolving (or dispersing) a hole transport material, an electron transport material, a binder resin, and other materials in a solvent (or a dispersion medium), and applying the dispersion liquid onto a conductive support (an intermediate layer such as an undercoat layer to be described later in the case where the intermediate layer is provided).

Hereinafter, the solvent or dispersion medium used for forming the photosensitive layer in contact with the protective layer (the outermost layer), for example, a single-layered photosensitive layer, and the coating method will be described.

[Solvent or Dispersion Medium]

Examples of the solvent or dispersion medium used for forming the photosensitive layer include: alcohols such as methanol, ethanol, propanol, and 2-methoxyethanol; ethers such as tetrahydrofuran, 1,4-dioxane, and dimethoxyethane; esters; ketones such as acetone, methyl ethyl ketone, and cyclohexanone; aromatic hydrocarbons such as benzene, toluene, xylene, and anisole; chlorinated hydrocarbons such as dichloromethane, chloroform, and 1,2-dichloroethane; nitrogen-containing compounds; and aprotic polar solvents such as acetonitrile, N-methylpyrrolidone, N, N-dimethylformamide, and dimethylsulfoxide. These may be used alone or in any combination of two or more kinds thereof in any ratio.

[Coating Method]

Examples of the coating method of the coating liquid for forming the photosensitive layer in contact with the protective layer (the outermost layer), for example, a single-layered photosensitive layer, include spray coating, spiral coating, ring coating, and dip coating.

In the dip coating, a total solid concentration of the coating liquid or dispersion liquid is preferably 5 mass % or more, and more preferably 10 mass % or more. In addition, the total solid concentration is preferably 50 mass % or less, and more preferably 35 mass % or less.

A viscosity of the coating liquid or dispersion liquid is preferably 50 mPa·s or more, and more preferably 100 mPa·s or more. In addition, the viscosity is preferably 700 mPa·s or less, and more preferably 500 mPa·s or less. Accordingly, a photosensitive layer having excellent uniformity in film thickness can be obtained.

After a coating film is formed by the above coating method, the coating film is dried, and it is preferred to adjust a drying temperature and a drying time such that necessary and sufficient drying can be performed.

The drying temperature is generally 80° C. or higher, and preferably 100° C. or higher from the viewpoint of preventing residual solvent. From the viewpoint of prevention of bubble generation and the electrical characteristics, the drying temperature is generally 250° C. or lower, preferably 170° C. or lower, and more preferably 140° C. or lower, and the temperature may be changed stepwise.

As a drying method, a hot air dryer, a steam dryer, an infrared dryer, a far infrared dryer, or the like can be used.

In the present invention, in order to provide the protective layer (the outermost layer), only air drying at room temperature may be performed after the photosensitive layer is coated, and then heat drying may be performed by the above method after the coating.

As for a thickness of the photosensitive layer, an optimum thickness is appropriately selected depending on the material to be used. From the viewpoint of the electrical characteristics and dielectric breakdown resistance, the thickness is preferably 5 μm or more, more preferably 10 μm or more, and particularly preferably 15 μm or more. From the viewpoint of the electrical characteristics, the thickness is preferably 100 μm or less, more preferably 50 μm or less, and particularly preferably 30 μm or less.

<Protective Layer (Outermost Layer)>

The protective layer (the outermost layer) of the photoreceptor according to the present invention has a structure obtained by polymerizing a compound having a chain polymerizable functional group.

In particular, when the protective layer (the outermost layer) is formed by radically polymerizing the compound having a chain polymerizable functional group, the effects of the present invention are more effectively exhibited. As described above, according to the present invention, by using the predetermined electron transport material, the electron transport material can be prevented from being concentrated on the photosensitive layer surface, so that the electron transport material can be prevented from trapping a radical generated by the curing reaction of the protective layer (the outermost layer) and inhibiting the curing reaction by radical polymerization. Therefore, the decrease in Martens hardness and the decrease in elastic deformation ratio of the photoreceptor surface can be prevented.

The chain polymerizable functional group in the compound having a chain polymerizable functional group includes an acryloyl group, a methacryloyl group, a vinyl group, and an epoxy group. Among them, examples of the chain polymerizable functional group capable of radical polymerization include an acryloyl group, a methacryloyl group, and a vinyl group, and an acryloyl group or a methacryloyl group is preferred from the viewpoint of curing rate.

The compound having a chain polymerizable functional group is not particularly limited as long as it is a known material, and from the viewpoint of curability, a monomer, an oligomer or a polymer having an acryloyl group or a methacryloyl group is preferred.

Preferred compounds are exemplified below.

Examples of the monomer having an acryloyl group or a methacryloyl group include trimethylolpropane triacrylate (A-TMPT), trimethylolpropane trimethacrylate, HPA-modified trimethylolpropane triacrylate, EO-modified trimethylolpropane triacrylate, PO-modified trimethylolpropane triacrylate, caprolactone-modified trimethylolpropane triacrylate, HPA-modified trimethylolpropane trimethacrylate, pentaerythritol triacrylate, pentaerythritol tetraacrylate, glycerol triacrylate, ECH-modified glycerol triacrylate, EO-modified glycerol triacrylate, PO-modified glycerol triacrylate, tris(acryloxyethyl) isocyanurate, caprolactone-modified tris(acryloxyethyl) isocyanurate, EO-modified tris (acryloxyethyl) isocyanurate, PO-modified tris (acryloxyethyl) isocyanurate, dipentaerythritol hexaacrylate (A-DPH), caprolactone-modified dipentaerythritol hexaacrylate, dipentaerythritol hydroxypentaacrylate, alkyl-modified dipentaerythritol pentaacrylate, alkyl-modified dipentaerythritol tetraacrylate, alkyl-modified dipentaerythritol triacrylate, dimethylolpropane tetraacrylate, pentaerythritol ethoxytetraacrylate, EO-modified phosphoric acid triacrylate, 2, 2, 5, 5, -tetrahydroxymethylcyclopentanone tetraacrylate, 2-hydroxy-3-acryloyloxypropyl methacrylate, polyethylene glycol diacrylate, polypropylene glycol diacrylate, polytetramethylene glycol diacrylate, EO-modified bisphenol A diacrylate, PO-modified bisphenol A diacrylate, 9,9-bis[4-(2-acryloyloxyethoxy)phenyl]fluorene, tricyclodecanedimethanol diacrylate, decanediol diacrylate, hexanediol diacrylate, ethylene glycol dimethacrylate, polyethylene glycol dimethacrylate, EO-modified bisphenol A dimethacrylate, PO-modified bisphenol A dimethacrylate, tricyclodecanedimethanol dimethacrylate, decanediol dimethacrylate, and hexanediol dimethacrylate.

Examples of the oligomer or the polymer having an acryloyl group or a methacryloyl group include a known urethane acrylate, ester acrylate, acrylic acrylate, and epoxy acrylate.

Examples of the urethane acrylate include "EBECRYL8301", "EBECRYL1290", "EBECRYL1830", and "KRM8200" (manufactured by DAICEL-ALLNEX LTD.), and "UV1700B", "UV7640B", "UV7605B", "UV6300B", and "UV7550B" (manufactured by Mitsubishi Chemical Corporation).

Examples of the ester acrylate include "M-7100", "M-7300K", "M-8030", "M-8060", "M-8100", "M-8530", "M-8560", and "M-9050" (manufactured by TOAGOSEI CO., LTD.).

Examples of the acrylic acrylate include "8BR-600", "8BR-930 MB", "8KX-078", "8KX-089", and "8KX-168" (manufactured by TAISEI FINE CHEMICAL CO., LTD.).

These may be used alone or in combination of two or more kinds thereof. Among them, a urethane acrylate is preferably contained from the viewpoint of the electrical characteristics.

The protective layer (the outermost layer) of the electrophotographic photoreceptor according to the present invention may contain metal oxide particles or a charge transport material in addition to the compound having a chain polymerizable functional group for the purpose of imparting charge transporting ability. A polymerization initiator may be contained in order to accelerate the polymerization reaction.

Hereinafter, the materials (the metal oxide particles, the charge transport material, and the polymerization initiator) used in the protective layer (the outermost layer) will be described in detail.

(Metal Oxide Particles)

The protective layer (the outermost layer) according to the present invention preferably contains the metal oxide particles from the viewpoint of imparting the charge transporting ability and improving mechanical strength.

As the metal oxide particles, any metal oxide particles that can be generally used in an electrophotographic photoreceptor can be used.

Specific examples of the metal oxide particles include metal oxide particles containing one metal element such as titanium oxide, tin oxide, aluminum oxide, indium oxide, silicon oxide, zirconium oxide, zinc oxide, and iron oxide, and metal oxide particles containing a plurality of metal elements such as indium tin oxide, calcium titanate, strontium titanate, and barium titanate. Among them, metal oxide particles having a bandgap of 2 eV to 4 eV are preferred. As for the metal oxide particles, only one kind of particles may be used, or a plurality of kinds of particles may be mixed and used.

Among the metal oxide particles, titanium oxide, tin oxide, indium tin oxide, aluminum oxide, silicon oxide, or zinc oxide is preferred, and titanium oxide or tin oxide is more preferred, from the viewpoint of the electron transporting property. Titanium oxide is particularly preferred.

As a crystal form of the titanium oxide particles, any one of rutile, anatase, brookite and amorphous can be used. In addition, from the titanium oxide particles of different crystal states, titanium oxide particles of a plurality of crystal states may be contained.

The metal oxide particles may be subjected to various surface treatments. For example, the metal oxide particles may be treated with an inorganic compound such as tin oxide, aluminum oxide, antimony oxide, zirconium oxide and silicon oxide, or with an organic compound such as stearic acid, a polyol, and an organosilicon compound. In particular, when titanium oxide particles are used, they are preferably surface-treated with an organosilicon compound. Examples of the organosilicon compound include: silicone oils such as dimethylpolysiloxane and methylhydrogenpolysiloxane; organosilanes such as methyldimethoxysilane and diphenyldidimethoxysilane; silazanes such as hexamethyldisilazane; and silane coupling agents such as 3-methacryloyloxypropyltrimethoxysilane, 3-acryloyloxypropyltrimethoxysilane, and vinyltrimethoxysilane. In particular, 3-methacryloyloxypropyltrimethoxysilane, 3-acryloyloxypropyltrimethoxysilane, or vinyltrimethoxysilane having a chain polymerizable functional group is preferred from the viewpoint of improving the mechanical strength of the protective layer (the outermost layer).

The metal oxide particles may be previously treated with an insulating material such as aluminum oxide, silicon oxide, or zirconium oxide before the outermost surface is treated with such a treatment agent.

As for the metal oxide particles, only one kind of particles may be used, or a plurality of kinds of particles may be mixed and used.

The metal oxide particles having an average primary particle diameter of 500 nm or less are generally preferably used, the metal oxide particles having an average primary particle diameter of 1 nm to 100 nm are more preferably used, and the metal oxide particles having an average primary particle diameter of 5 nm to 50 nm are even more preferably used.

The average primary particle diameter can be obtained based on an arithmetic average value of particle diameters directly observed with a transmission electron microscope (hereinafter also referred to as TEM).

Among the metal oxide particles according to the present invention, specific examples of a trade name of the titanium oxide particles include: ultrafine titanium oxide "TTO-55 (N)" and "TTO-51 (N)" not surface-treated, ultrafine titanium oxide "TTO-55 (A)" and "TTO-55 (B)" coated with $Al_2O_3$, ultrafine titanium oxide "TTO-55 (C)" surface-treated with stearic acid, ultrafine titanium oxide "TTO-55 (S)" surface-treated with $Al_2O_3$ and organosiloxane, high-purity titanium oxide "C-EL", sulfate process titanium oxide "R-550", "R-580", "R-630", "R-670", "R-680", "R-780", "A-100", "A-220", and "W-10", chloride process titanium oxide "CR-50", "CR-58", "CR-60", "CR-60-2", and "CR-67", and conductive titanium oxide "ET-300W" (all manufactured by ISHIHARA SANGYO KAISHA, LTD.); titanium oxide such as "R-60", "A-110", and "A-150", and "SR-1", "R-GL", "R-5N", "R-5N-2", "R-52N", "RK-1", and "A-SP" coated with $Al_2O_3$, "R-GX" and "R-7E" coated with $SiO_2$ and $Al_2O_3$, "R-650" coated with ZnO, $SiO_2$ and $Al_2O_3$, and "R-61N" coated with $ZrO_2$ and $Al_2O_3$ (all manufactured by SAKAI CHEMICAL INDUSTRY CO., LTD.); "TR-700" surface-treated with $SiO_2$ and $Al_2O_3$, and "TR-840" and "TA-500" surface-treated with ZnO, $SiO_2$ and $Al_2O_3$, and surface untreated titanium oxide such as "TA-100", "TA-200", and "TA-300", and "TA-400" surface-treated with $Al_2O_3$ (all manufactured by FUJI TITANIUM INDUSTRY CO., LTD.); and "MT-150W" and "MT-500B" not surface-treated, "MT-100SA" and "MT-500SA" surface-treated with $SiO_2$ and $Al_2O_3$, "MT-100SAS" and "MT-500SAS" surface-treated with $SiO_2$, $Al_2O_3$ and organosiloxane (all manufactured by TAYCA CORPORATION).

Specific examples of a trade name of aluminum oxide particles include "Aluminum Oxide C" (manufactured by NIPPON AEROSIL CO., LTD.).

Specific examples of a trade name of silicon oxide particles include "200CF", and "R972" (manufactured by NIPPON AEROSIL CO., LTD.), and "KEP-30" (manufactured by NIPPON SHOKUBAI CO., LTD.).

Specific examples of a trade name of tin oxide particles include "SN-100P" and "SN-100D" (manufactured by ISHIHARA SANGYO KAISHA, LTD.), "SnO2" (manufactured by CIK NanoTek Corporation), and "S-2000", phosphorus-doped tin oxide "SP-2", antimony-doped tin oxide "T-1", and indium-doped tin oxide "E-ITO" (manufactured by Mitsubishi Materials Corporation).

Specific examples of a trade name of zinc oxide particles include "MZ-305S" (manufactured by TAYCA CORPORATION). The metal oxide particles usable in the present invention are not limited thereto.

A content of the metal oxide particles in the protective layer (the outermost layer) of the electrophotographic photoreceptor according to the present invention is not particularly limited. From the viewpoint of the electrical characteristics, the content is preferably 10 parts by mass or more, more preferably 20 parts by mass or more, and particularly preferably 30 parts by mass or more, with respect to 100 parts by mass of the binder resin. From the viewpoint of maintaining good surface resistance, the content is preferably 300 parts by mass or less, more preferably 200 parts by mass or less, and particularly preferably 120 parts by mass or less.

(Charge Transport Material)

The charge transport material contained in the protective layer (the outermost layer) may be the same as the charge transport material used in the photosensitive layer.

From the viewpoint of improving the Martens hardness of the photoreceptor surface, the protective layer (the outermost layer) may have a structure obtained by polymerizing the charge transport material having a chain polymerizable functional group.

The chain polymerizable functional group in the charge transport material having a chain polymerizable functional group includes an acryloyl group, a methacryloyl group, a vinyl group, and an epoxy group. Among them, an acryloyl group or a methacryloyl group is preferred from the viewpoint of curability. Examples of a structure of a charge transport material portion of the charge transport material having a chain polymerizable functional group include electron-donating materials such as heterocyclic compounds such as a carbazole derivative, an indole derivative, an imidazole derivative, an oxazole derivative, a pyrazole derivative, a thiadiazole derivative, and a benzofuran derivative, an aniline derivative, a hydrazone derivative, an arylamine derivative, a stilbene derivative, a butadiene derivative, and an enamine derivative, and compounds each made of two or more of these compounds bonded together or polymers each including, in a main chain or a side chain thereof, a group constituted of any one of these compounds. Among them, a carbazole derivative, an arylamine derivative, a stilbene derivative, a butadiene derivative, an enamine derivative, or compounds in which a plurality of these compounds are bound, is preferred from the viewpoint of the electrical characteristics.

An amount of the charge transport material to be used in the protective layer (the outermost layer) of the electrophotographic photoreceptor according to the present invention is not particularly limited. From the viewpoint of the electrical characteristics, the amount is preferably 10 parts by mass or more, more preferably 30 parts by mass or more, and particularly preferably 50 parts by mass or more, with respect to 100 parts by mass of the binder resin. From the viewpoint of maintaining good surface resistance, the amount is preferably 300 parts by mass or less, more preferably 200 parts by mass or less, and particularly preferably 150 parts by mass or less.

(Polymerization Initiator)

Examples of the polymerization initiator include a thermal polymerization initiator and a photopolymerization initiator.

Examples of the thermal polymerization initiator include peroxide compounds such as 2,5-dimethylhexane-2,5-dihydroperoxide, and azo compounds such as 2,2'-azobis(isobutyronitrile).

The photopolymerization initiator can be classified into a direct cleavage type and a hydrogen abstraction type depending on a difference in a radical generation mechanism. The direct cleavage type photopolymerization initiator generates a radical by partly cleaving covalent bonds in one molecule thereof upon absorption of light energy. On the other hand, in the hydrogen abstraction type photopolymerization initiator, a molecule in a state of being excited by absorbing light energy abstracts hydrogen from a hydrogen donor to generate a radical.

Examples of the direct cleavage type photopolymerization initiator include: acetophenone-based or ketal-based compounds such as acetophenone, 2-benzoyl-2-propanol, 1-benzoylcyclohexanol, 2,2-diethoxyacetophenone, benzyldimethylketal, and 2-methyl-4'-(methylthio)-2-morpholinopropiophenone; benzoin ether-based compounds such as benzoin, benzoin methyl ether, benzoin ethyl ether, benzoin isobutyl ether, benzoin isopropyl ether, and O-tosyl benzoin; and acylphosphine oxide-based compounds such as diphenyl(2,4,6-trimethylbenzoyl)phosphine oxide, phenylbis(2,4,6-trimethylbenzoyl)phosphine oxide, and lithium phenyl(2,4,6-trimethylbenzoyl)phosphonate.

Examples of the hydrogen abstraction type photopolymerization initiator include: benzophenone-based compounds such as benzophenone, 4-benzoylbenzoic acid, 2-benzoylbenzoic acid, methyl 2-benzoylbenzoate, methyl benzoylformate, benzyl, p-anisyl, 2-benzoylnaphthalene, 4,4'-bis(dimethylamino)benzophenone, 4,4'-dichlorobenzophenone, and 1,4-dibenzoylbenzene; and anthraquinone-based or thioxanthone-based compounds such as 2-ethylanthraquinone, 2-isopropylthioxanthone, 2-chlorothioxanthone, 2,4-dimethylthioxanthone, 2,4-diethylthioxanthone, and 2,4-dichlorothioxanthone. Examples of other photopolymerization initiators include camphorquinone, 1-phenyl-1,2-propanedione-2-(o-ethoxycarbonyl)oxime, acridine-based compounds, triazine-based compounds, and imidazole-based compounds.

The photopolymerization initiator preferably has an absorption wavelength in a wavelength region of a light source used for light emission in order to efficiently absorb light energy to generate a radical. On the other hand, when a component other than the photopolymerization initiator among the compounds contained in the protective layer (the outermost layer) has absorption in the wavelength region, the photopolymerization initiator may not absorb sufficient light energy, and the radical generation efficiency may decrease. Since general binder resins, charge transport materials, and metal oxide particles have an absorption wavelength in an ultraviolet region (UV), this effect is particularly remarkable when the light source used for light emission is ultraviolet light (UV). From the viewpoint of preventing such a problem, it is preferred to contain an acylphosphine oxide-based compound, which has an absorption wavelength on a relatively long wavelength side, among the photopolymerization initiator. Since the acylphosphine oxide-based compound has a photo-bleaching effect in which the absorption wavelength region is changed to a low wavelength side due to self-cleavage, the acylphosphine oxide-based compound can transmit light to the inside of the protective layer (the outermost layer), and is also preferred from the viewpoint of good internal curability. In this case, from the viewpoint of supplementing the curability of the protective layer (the outermost layer) surface, it is more preferred to use a hydrogen abstraction type initiator in combination. A content proportion of the hydrogen abstraction type initiator to the acylphosphine oxide-based compound is not particularly limited, and is preferably 0.1 part by mass or more with respect to 1 part by mass of the acylphosphine oxide-based compound from the viewpoint of supplementing the surface curability, and is preferably 5 parts by mass or less with respect to 1 part by mass of the acylphosphine oxide-based compound from the viewpoint of maintaining the internal curability.

In addition, a compound having a photopolymerization accelerating effect may be used alone or in combination with the photopolymerization initiator. Examples thereof include triethanolamine, methyldiethanolamine, ethyl 4-dimethylaminobenzoate, isoamyl 4-dimethylaminobenzoate, (2-dimethylamino) ethyl benzoate, and 4,4'-dimethylaminobenzophenone.

The polymerization initiator may be used alone or in combination of two or more kinds thereof. A content of the polymerization initiator is 0.5 part by mass to 40 parts by mass, and preferably 1 part by mass to 20 parts by mass, with respect to 100 parts by mass of all compounds having a radical polymerization property.

(Method for Forming Protective Layer (Outermost Layer))

Next, a method for forming the protective layer (the outermost layer) will be described.

The method for forming the protective layer (the outermost layer) is not particularly limited. For example, the protective layer (the outermost layer) can be formed by applying a coating liquid obtained by dissolving a binder resin, a charge transport material, metal oxide particles, and other materials in a solvent or a coating liquid obtained by dispersing a binder resin, a charge transport material, metal oxide particles, and other materials in a dispersion medium.

Hereinafter, the solvent or dispersion medium used for forming the protective layer (the outermost layer), and the coating method will be described.

[Solvent Used in Coating Liquid for Forming Protective Layer (Outermost Layer)]

As the organic solvent used in the coating liquid for forming the protective layer (the outermost layer) according to the present invention, any organic solvent can be used as long as it can dissolve the materials according to the present invention. Specific examples thereof include: alcohols such as methanol, ethanol, propanol, and 2-methoxyethanol; ethers such as tetrahydrofuran, 1,4-dioxane, and dimethoxyethane; esters such as methyl formate and ethyl acetate; ketones such as acetone, methyl ethyl ketone, and cyclohexanone; aromatic hydrocarbons such as benzene, toluene, xylene, and anisole; chlorinated hydrocarbons such as dichloromethane, chloroform, 1,2-dichloroethane, 1,1,2-trichloroethane, 1,1,1-trichloroethane, tetrachloroethane, 1,2-dichloropropane, and trichloroethylene; nitrogen-containing compounds such as n-butylamine, isopropanolamine, diethylamine, triethanolamine, ethylenediamine, and triethylenediamine; and aprotic polar solvents such as acetonitrile, N-methylpyrrolidone, N,N-dimethylformamide, and dimethylsulfoxide. A solvent mixture of these organic solvents in any combination and in any proportion can also be used. Even an organic solvent that does not dissolve the materials for the protective layer (the outermost layer) according to the present invention by itself can be used as long as the materials can be dissolved in the solvent mixture with the organic solvent. In general, when a solvent mixture is used, coating unevenness can be reduced. When dip coating is used in the coating method to be described later, it is preferred to select a solvent that does not dissolve a lower layer. From this viewpoint, it is preferred to contain alcohols having low solubility in polycarbonates and polyarylates that are suitably used in the photosensitive layer.

An amount ratio of the organic solvent and the solid content used in the coating liquid for forming the protective layer (the outermost layer) according to the present invention varies depending on the coating method of the coating liquid for forming the protective layer (the outermost layer), and may be appropriately changed and used such that a uniform coating film is formed in the coating method to be applied.

[Coating Method]

The coating method of the coating liquid for forming the protective layer (the outermost layer) is not particularly limited, and examples thereof include spray coating, spiral coating, ring coating, and dip coating.

After the coating film is formed by the above coating method, the coating film is dried. At this time, a drying temperature and a drying time are not limited as long as necessary and sufficient drying can be obtained. In the case where the protective layer (the outermost layer) is applied only by air drying after the photosensitive layer is coated, it is preferred to dry sufficiently by the method described in [Coating Method] of the photosensitive layer.

As for the thickness of the protective layer (the outermost layer), an optimum thickness is appropriately selected depending on the material to be used. From the viewpoint of life, the thickness is preferably 0.1 μm or more, more preferably 0.2 μm or more, and particularly preferably 0.5 μm or more. From the viewpoint of the electrical characteristics, the thickness is preferably 10 μm or less, more preferably 5 μm or less, and particularly preferably 3 μm or less.

[Method for Curing Protective Layer (Outermost Layer)]

The protective layer (the outermost layer) is formed by applying such a coating liquid and then curing the coating liquid by externally applying energy. The external energy used at this time includes heat, light, and radiation.

Heat energy can be applied by heating from a coating surface side or a support side using a gas such as air and nitrogen, a vapor, various heating media, infrared rays, or electromagnetic waves. A heating temperature is preferably 100° C. or higher and 170° C. or lower. When the heating temperature is equal to or higher than the lower limit temperature, the reaction rate is sufficient and the reaction proceeds completely. When the heating temperature is equal to or lower than the upper limit temperature, the reaction proceeds uniformly, and the generation of large strain in the protective layer (the outermost layer) can be prevented. In order to proceed the curing reaction uniformly, a method of heating at a relatively low temperature of lower than 100° C. and then heating to 100° C. or higher to complete the reaction is also effective.

As light energy, a UV emitting light source such as a high-pressure mercury lamp, a metal halide lamp, an electrodeless lamp bulb, or a light emitting diode having an emission wavelength mainly for ultraviolet light (UV) can be used. A visible light source in accordance with an absorption wavelength of the chain polymerizable compound or the photopolymerization initiator can be selected.

From the viewpoint of the curability, a light emitting amount (accumulated light amount) is preferably 0.1 $J/cm^2$ or more, more preferably 0.5 $J/cm^2$ or more, and particularly preferably 1 $J/cm^2$ or more. From the viewpoint of the electrical characteristics, the light emitting amount is preferably 150 $J/cm^2$ or less, more preferably 100 $J/cm^2$ or less, and particularly preferably 50 $J/cm^2$ or less.

Examples of radiation energy include those using an electron beam (EB).

Among the energy, light energy is preferred from the viewpoint of ease of reaction rate control, simplicity of apparatus, and length of pot life.

After the protective layer (the outermost layer) is cured, a heating step may be added from the viewpoint of alleviating residual stress, alleviating residual radicals, and improving the electrical characteristics. A heating temperature is preferably 60° C. or higher, and more preferably 100° C. or higher, and is preferably 200° C. or lower, and more preferably 150° C. or lower.

[Martens Hardness]

In the first, second, and third embodiments according to the present invention, as described above, when the molecular weight of the hole transport material and the molecular weight of the electron transport material, the ratio of the substance amount (the molar amount) of the hole transport material or the ratio of the molecular weight of the hole transport material in the photosensitive layer in contact with the protective layer (the outermost layer), for example, a single-layered photosensitive layer, is within a specific range, the hole transport material and the electron transport material can be prevented from being concentrated on the photosensitive layer surface, and as a result, the decrease in Martens hardness of the photoreceptor surface can be prevented.

From the viewpoint of abrasion resistance, the Martens hardness of the photoreceptor surface is preferably 300 $N/mm^2$ or more, more preferably 350 $N/mm^2$ or more, and even more preferably 400 $N/mm^2$ or more. From the viewpoint of preventing residual stress and crack generation, the Martens hardness of the photoreceptor surface is preferably 600 $N/mm^2$ or less, and more preferably 450 $N/mm^2$ or less.

In the present invention, the Martens hardness of the photoreceptor means a Martens hardness measured from a surface side of the photoreceptor.

The Martens hardness can be measured by a method described in Examples below.

[Elastic Deformation Ratio]

In the first, second, and third embodiments according to the present invention, as described above, when the molecular weight of the hole transport material and the molecular weight of the electron transport material, the ratio of the substance amount (the molar amount) of the hole transport material, or the ratio of the molecular weight of the hole transport material in the photosensitive layer in contact with the protective layer (the outermost layer), for example, a single-layered photosensitive layer, is within a specific range, the hole transport material and the electron transport material can be prevented from being concentrated on the photosensitive layer surface, and as a result, the decrease in elastic deformation ratio of the photoreceptor surface can be prevented.

From the viewpoint of the abrasion resistance, the elastic deformation ratio of the photoreceptor surface is preferably 30% or more, more preferably 35% or more, and even more preferably 40% or more. From the viewpoint of preventing the residual stress and the crack generation, the elastic deformation ratio of the photoreceptor surface is preferably 60% or less, and more preferably 55% or less.

In the present invention, the elastic deformation ratio of the photoreceptor means an elastic deformation ratio measured from the surface side of the photoreceptor.

The elastic deformation ratio can be measured by a method described in Examples below.

<Undercoat Layer>

The electrophotographic photoreceptor according to the present invention may include the undercoat layer between the photosensitive layer and the conductive support.

As the undercoat layer, for example, a resin or a resin with an organic pigment or metal oxide particles dispersed therein can be used.

Examples of the organic pigment to be used in the undercoat layer include a phthalocyanine pigment, an azo pigment, and a perylene pigment. Among them, a phthalocyanine pigment and an azo pigment, specifically, a phthalocyanine pigment and an azo pigment in the case of being used as the above-described charge generation material can be exemplified.

Examples of the metal oxide particles to be used in the undercoat layer include metal oxide particles containing one metal element such as titanium oxide, aluminum oxide, silicon oxide, zirconium oxide, and zinc oxide, and metal oxide particles containing a plurality of metal elements such as strontium titanate. As for the undercoat layer, only one kind of particles may be used, or a plurality of kinds of particles may be mixed and used in any ratio and in any combination.

Among the above metal oxide particles, titanium oxide or aluminum oxide is preferred, and titanium oxide is particularly preferred. The surface of the titanium oxide particles may be treated with, for example, an inorganic compound or an organic compound. As a crystal form of the titanium oxide particles, any one of rutile, anatase, brookite and amorphous can be used. In addition, titanium oxide particles of a plurality of crystal states may be contained.

A particle diameter of the metal oxide particles used in the undercoat layer is not particularly limited. From the viewpoint of properties of the undercoat layer and stability of the solution for forming the undercoat layer, an average primary particle diameter of the metal oxide particles is preferably 10 nm or more, and is 100 nm or less, and more preferably 50 nm or less.

Here, the undercoat layer is preferably formed by dispersing particles in a binder resin.

The binder resin to be used in the undercoat layer can be selected from insulating resins such as a polyvinyl butyral resin, a polyvinyl formal resin, a polyvinyl acetal-based resin, a polyarylate resin, a polycarbonate resin, a polyester resin, a modified ether-based polyester resin, a phenoxy resin, a polyvinyl chloride resin, a polyvinylidene chloride resin, a polyvinyl acetate resin, a polystyrene resin, an acrylic resin, a methacrylic resin, a polyacrylamide resin, a polyamide resin, a polyvinylpyridine resin, a cellulose-based resin, a polyurethane resin, an epoxy resin, a silicone resin, a polyvinyl alcohol resin, a polyvinylpyrrolidone resin, a casein, a vinyl chloride-vinyl acetate-based copolymer, a styrene-butadiene copolymer, a vinylidene chloride-acrylonitrile copolymer, and a silicone-alkyd resin, and an organic photoconductive polymer such as poly-N-vinylcarbazole, but is not limited to these polymers. The binder resin may be used alone, may be used in combination of two or more kinds thereof, or may be used in a form cured together with a curing agent. Among them, a polyvinyl butyral resin, a polyvinyl formal resin, a polyvinyl acetal-based resin, an alcohol-soluble copolyamide, a modified polyamide, and the like are preferred because they exhibit good dispersibility and coatability.

A mixing ratio of the particles to the binder resin can be freely selected. Use in a range of 10 mass % to 500 mass % is preferred in terms of stability and coatability of the dispersion liquid. A film thickness of the undercoat layer may be freely selected, and is preferably 0.1 μm or more and 20 μm or less from the viewpoint of the characteristics of the electrophotographic photoreceptor and the coatability of the dispersion liquid. In addition, the undercoat layer may contain a known antioxidant or the like.

<Other Layers>

In addition, the electrophotographic photoreceptor according to the present invention may include other layers as necessary in addition to the conductive support, the photosensitive layer, the protective layer (the outermost layer), and the undercoat layer described above.

<Description of Phrases>

In the present invention, unless otherwise specified, "X to Y" (X and Y are any number) includes a meaning of "X or more and Y or less", and also includes a meaning of "preferably larger than X" and "preferably smaller than Y".

In addition, "X or more" (X is any number) or "Y or less" (Y is any number) also includes an intention of "preferably larger than X" or "preferably smaller than Y".

EXAMPLES

Hereinafter, the embodiments of the present invention will be described more specifically with reference to Examples. The following Examples are shown for the purpose of explaining the present invention in detail, and the present invention is not limited to Examples shown below and can be freely modified as long as it does not deviate from the gist of the present invention. In addition, "part" in the following Examples and Comparative Examples indicates "part by mass" unless otherwise specified.

Example 1

<Preparation of Photoreceptor>

A photoreceptor was prepared by the following procedure.

(Formation of Undercoat Layer)

20 parts of D-form titanyl phthalocyanine exhibiting a clear peak at a diffraction angle $2\theta\pm0.2°$ of 27.3° in powder X-ray diffraction using CuKα rays and 280 parts of 1,2-dimethoxyethane were mixed with each other, and the mixture was pulverized with a sand grind mill for 2 hours to be subjected to an atomization dispersion treatment. 400 parts of a 2.5% 1,2-dimethoxyethane solution of polyvinyl butyral (trade name: "DENKA BUTYRAL" #6000C manufactured by DENKI KAGAKU KOGYO KABUSHIKI KAISHA) and 170 parts of 1,2-dimethoxyethane were further mixed to prepare a coating liquid for an undercoat layer. The coating liquid was applied onto an aluminum plate having a thickness of 0.3 mm with a wire bar such that a film thickness after drying was 0.4 μm, and then air-dried to form an undercoat layer.

[Formation of Single-layered Photosensitive Layer]

2.6 parts of D-form titanyl phthalocyanine exhibiting a clear peak at a diffraction angle $2\theta\pm0.2°$ of 27.3° in powder X-ray diffraction using CuKα rays, 1.3 parts of a perylene pigment 1 having the following structure, 60 parts of the following hole transport material (HTM48, molecular weight: 748), 50 parts of the following electron transport material (ET-2, molecular weight: 424.2), 100 parts of the following binder resin 1, and 0.05 part of a silicone oil (trade name: KF-96, manufactured by Shin-Etsu Chemical Co., Ltd.) as a leveling agent were mixed with 974 parts of a solvent mixture of tetrahydrofuran (hereinafter, abbreviated as THF) and toluene (hereinafter, abbreviated as TL) (THF: 80 mass %, and TL: 20 mass %) to prepare a coating liquid for a single-layered photosensitive layer. The coating liquid was applied onto the undercoat layer with a bar coater such that a film thickness after drying was about 20 μm, and dried at 100° C. for 20 minutes to form a single-layered photosensitive layer.

HTM48

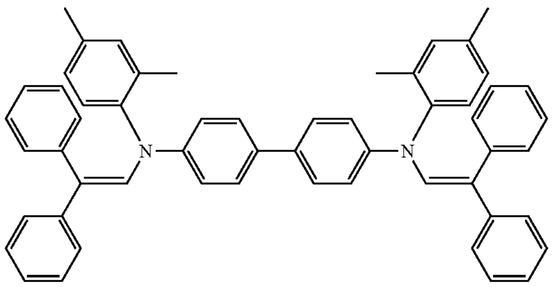

ET-2

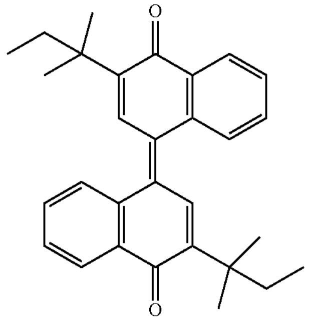

-continued

BINDER RESIN 1

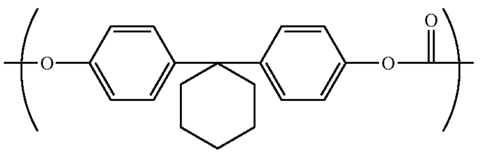

VISCOSITY AVERAGE MOLECULAR WEIGHT: 40000

PERYLENE PIGMENT 1

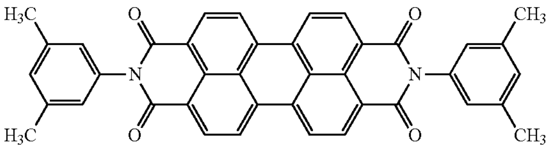

(Formation of Protective Layer (Outermost Layer))

100 parts of a urethane acrylate UV6300B (manufactured by Mitsubishi Chemical Corporation), 55 parts of titanium oxide particles (TTO55N, manufactured by ISHIHARA SANGYO KAISHA, LTD.) surface-treated with 7 mass % of 3-methacryloyloxypropyltrimethoxysilane with respect to particles, 1 part of benzophenone as a photopolymerization initiator, 2 parts of diphenyl(2,4,6-trimethylbenzoyl)phosphine oxide, and 745 parts of a solvent mixture of methanol, 1-propanol, and toluene (methanol: 70 mass %, 1-propanol: 10 mass %, and toluene: 20 mass %) were mixed to prepare a coating liquid for a protective layer (an outermost layer). The coating liquid was applied onto the single-layered photosensitive layer with a wire bar such that a film thickness after curing was 1 μm, and then heated at 115° C. for 20 minutes. UV light was emitted from a surface side of the coating film using a UV light emission device equipped with a UV-LED lamp having a peak at a wavelength of 385 nm so as to obtain an accumulated light amount of 25.5 $J/cm^2$. Further, the coating liquid was heated at 125° C. for 10 minutes and then cooled to 25° C. to form a protective layer (an outermost layer).

Examples 2 to 5 and Comparative Examples 1 to 4

A hole transport material and an electron transport material used in a single-layered photosensitive layer, contents thereof, and a compound having a chain polymerizable functional group used in a protective layer (an outermost layer) were shown in Table 1. A structure of each used compound was shown below. Except for this, photoreceptors in Examples 2 to 5 and Comparative Examples 1 to 4 were prepared by a procedure same as that in Example 1.

HTM40

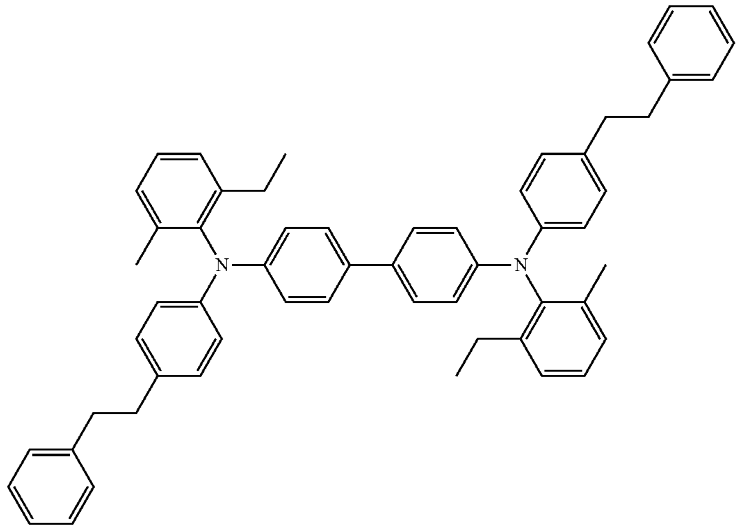

HTM42

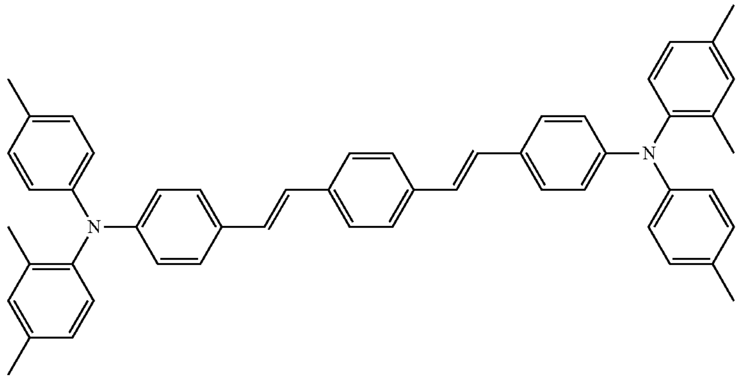

-continued
HTM43
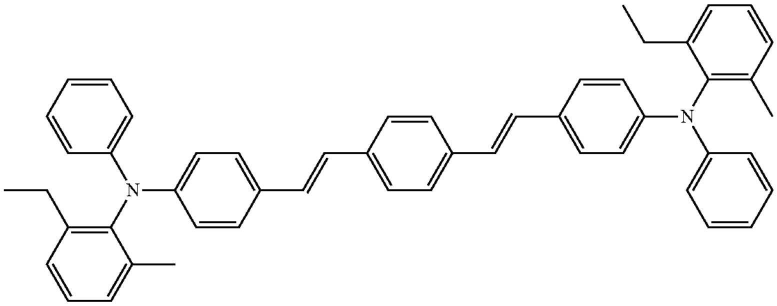
HTM6
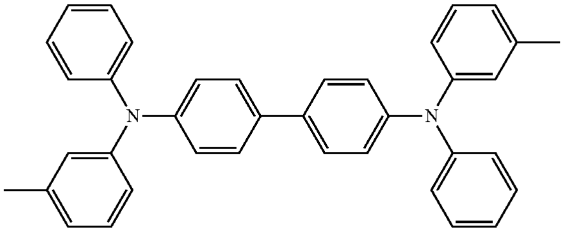
HTM26
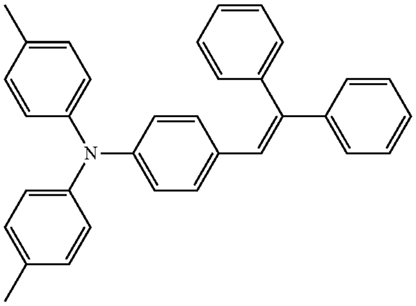
ET-5
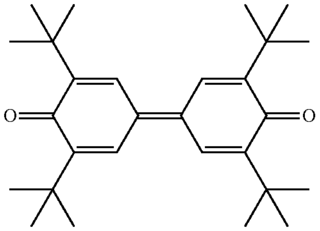
ET-4
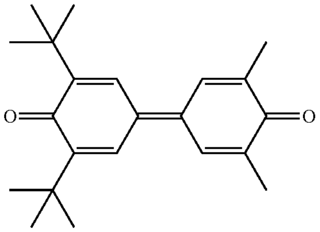
ET-8
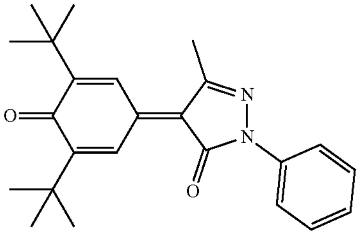

<Martens Hardness and Elastic Deformation Ratio of Photoreceptor Surface>

A Martens hardness and an elastic deformation ratio of a photoreceptor surface were measured using a microhardness tester FISCHERSCOPEHM 2000 manufactured by Fischer under an environment of a temperature of 25° C. and a relative humidity of 50%. A Vickers quadrangular pyramid diamond indenter having a facing angle of 136° was used for the measurement. Measurement conditions were set as follows, a load applied to the indenter and an indentation depth under the load were continuously read, and a profile obtained by plotting them on a Y axis and on an X axis, respectively as shown in FIG. 1, was obtained. When the load is applied to the indenter, a transition from A to B shown in FIG. 1 is occurred, and when the load is removed, a transition from B to C shown in FIG. 1 is occurred. Results are shown in Table 1.

Measurement Conditions

Maximum indentation load: 0.2 mN

Loading time: 10 seconds

Loading removing time: 10 seconds

The martens hardness is a value defined by the following equation based on the indentation depth at that time.

$$\text{Martens hardness } (N/\text{mm}^2) = \text{test load } (N)/\text{surface area of Vickers indenter under test load } (\text{mm}^2)$$

The elastic deformation ratio is a value defined by the following equation, and is a proportion of a work performed by a film elastically during loading removal to a total work required for indentation.

$$\text{Elastic deformation ratio } (\%) = (We/Wt) \times 100$$

In the above equation, the total work Wt (nJ) is an area surrounded by A-B-D-A in FIG. 1, and the elastic deformation work We (nJ) is an area surrounded by C-B-D-C. The larger the elastic deformation ratio is, the more difficult it is for deformation to remain under a load, and an elastic deformation ratio of 100 means that no deformation remains.

<Adhesion Test>

Using an NT cutter (manufactured by NT Incorporated.), six vertical cuts and six horizontal cuts were formed at intervals of 2 mm on each of the single-layered photoreceptors prepared in Examples and Comparative Examples to prepare 25 squares of 5×5. A cellophane tape (manufactured by 3M) was adhered thereon, and pulled up at an angle of 90° with respect to an adhesion surface to test adhesion between the photosensitive layer and the protective layer (the outermost layer). A proportion (%) of the number of squares of the protective layer (the outermost layer) remaining on the photosensitive layer was evaluated as a residual ratio (%). The larger the number of remaining squares, the higher the residual ratio and the better the adhesion. In any test, no peeling was observed between an aluminum plate as a support and the photosensitive layer, and when peeling occurred, the peeling occurred in the vicinity of an interface between the photosensitive layer and the protective layer (the outermost layer). Results are shown in Table 1.

TABLE 1

| | Photosensitive layer | | | | | | | | Protective layer (outermost layer) | Evaluation | | |
|---|---|---|---|---|---|---|---|---|---|---|---|---|
| | Hole transport material (HTM) | Molecular weight a of HTM | Content A of HTM | Electron transport material (ETM) | Molecular weight b of ETM | Content B of ETM | a/b | (B/b)/(A/a) | Compound having chain polymerizable functional group | Martens hardness ($N/mm^2$) | Elastic deformation ratio (%) | Adhesion (%) |
| Example 1 | HTM48 | 748.0 | 60 | ET-2 | 424.2 | 50 | 1.76 | 1.47 | UV6300B | 342 | 43 | 48 |
| Example 2 | HTM40 | 776.4 | 60 | ET-2 | 424.2 | 50 | 1.83 | 1.53 | UV6300B | 354 | 55 | 96 |
| Example 3 | HTM42 | 700.4 | 60 | ET-2 | 424.2 | 50 | 1.65 | 1.38 | UV6300B | 341 | 52 | 24 |
| Example 4 | HTM43 | 700.4 | 60 | ET-2 | 424.2 | 50 | 1.65 | 1.38 | UV6300B | 341 | 51 | 72 |
| Example 5 | HTM48 | 748.0 | 60 | ET-5 | 408.3 | 50 | 1.83 | 1.53 | UV6300B | 485 | 102 | 100 |
| Comparative Example 1 | HTM6 | 552.3 | 60 | ET-2 | 424.2 | 50 | 1.30 | 1.08 | UV6300B | 344 | 50 | 0 |
| Comparative Example 2 | HTM26 | 451.6 | 60 | ET-2 | 424.2 | 50 | 1.06 | 0.89 | UV6300B | 355 | 50 | 0 |
| Comparative Example 3 | HTM48 | 748.0 | 60 | ET-4 | 324.2 | 50 | 2.31 | 1.92 | UV6300B | 46 | 6 | 44 |
| Comparative Example 4 | HTM48 | 748.0 | 60 | ET-8 | 376.2 | 50 | 1.99 | 1.66 | UV6300B | 131 | 17 | 100 |

<Measurement Result>

In Comparative Examples 1 and 2, the adhesion was significantly low. It is considered that this is because the hole transport materials (HTM) used in Comparative Examples 1 and 2 have a small molecular weight, so that the hole transport material (HTM) is concentrated on the surface layer side to become steric hindrance, and the entanglement between the cured film on the outermost surface and the binder resin of the photosensitive layer is inhibited.

On the other hand, in Comparative Examples 3 and 4, the Martens hardness and the elastic deformation ratio of the protective layer (the outermost layer) were significantly low, and it was confirmed that the curing did not proceed sufficiently. It is considered that this is because the electron transport materials (ETM) used in Comparative Examples 3 and 4 have a small molecular weight, so that the electron transport material (ETM) is concentrated on the protective layer (the outermost layer) side, and is further transferred to the protective layer (the outermost layer) side to inhibit the curing reaction in the protective layer (the outermost layer).

In contrast to Comparative Examples 1 to 4, in Examples 1 to 5, the Martens hardness was high, the elastic deformation ratio was high, and the adhesion between the photosensitive layer and the protective layer (the outermost layer) was excellent. It is considered that this is because both the molecular weight a of the hole transport material (HTM) and the molecular weight b of the electron transport material (ETM) in the photosensitive layer are within predetermined ranges, and satisfy the following formulae (1) and (2), respectively.

$$600 \leq a \quad (1)$$

$$400 \leq b \quad (2)$$

(In the formula (1), a represents a molecular weight of the hole transport material, and in the formula (2), b represents a molecular weight of the electron transport material.)

Therefore, it can be considered that, in an electrophotographic photoreceptor including a conductive support and at least a photosensitive layer and a protective layer (an outermost layer) provided on the conductive support, when the protective layer (the outermost layer) has a structure obtained by polymerizing a compound having a chain polymerizable functional group, and the photosensitive layer in contact with the protective layer (the outermost layer) contains a hole transport material satisfying the above formula (1) and an electron transport material satisfying the above formula (2), an electrophotographic photoreceptor having a high Martens hardness, a high elastic deformation ratio, and excellent adhesion between the photosensitive layer and the protective layer (the outermost layer) can be obtained.

From the results of above Examples and Comparative Examples and the results of the tests conducted by the present inventors, it is found that when the ratio of the substance amount (mol) of the hole transport material to the substance amount (mol) of the electron transport material contained in the photosensitive layer is within an appropriate range, the concentration of the hole transport material and the concentration of the electron transport material can be prevented in a well-balanced manner, and the Martens hardness, the elastic deformation ratio, and the adhesion can be further improved. It is considered that when both the hole transport material and the electron transport material are contained in the photosensitive layer, the electron transfer occurs from the hole transport material to the electron transport material, and as a result, the positively charged hole transport material and the negatively charged electron transport material form a charge transfer complex. It is considered that this is because the electrostatic attraction acts between the hole transport material and the electron transport material forming the charge transfer complex, which has the effect of preventing concentration of both materials on the photoreceptor surface.

$$1.20 \leq (B/b)/(A/a) \leq 1.60 \quad (5)$$

(In the formula (5), A represents a content (part by mass) of the hole transport material with respect to 100 of the binder resin content, a represents a molecular weight of the hole transport material, B represents a content (part by mass) of the electron transport material with respect to 100 of the binder resin content, and b represents a molecular weight of the electron transport material.)

Therefore, it can be considered that, in an electrophotographic photoreceptor including a conductive support and at least a photosensitive layer and a protective layer (an outermost layer) provided on the conductive support, when the protective layer (the outermost layer) has a structure obtained by polymerizing a compound having a chain polymerizable functional group, the photosensitive layer in contact with the protective layer (the outermost layer) contains at least a binder resin, a hole transport material, and an electron transport material, and the photosensitive layer in contact with the protective layer (the outermost layer) satisfies the above formula (5), an electrophotographic photoreceptor having a high Martens hardness, a high elastic deformation ratio, and excellent adhesion between the photosensitive layer and the protective layer (the outermost layer) can be obtained.

Further, from the results of above Examples and Comparative Examples, it is found that when the ratio (a/b) of the molecular weight a of the hole transport material to the molecular weight b of the electron transport material contained in the photosensitive layer is 1.40 or more and 1.90 or less, the concentration of the hole transport material and the concentration of the electron transport material can be prevented in a well-balanced manner, and the Martens hardness, the elastic deformation ratio, and the adhesion can be further improved. It is considered that this is because, when the ratio a/b is 1.40 or more, the migration of the hole transport material to the photosensitive layer surface side is reduced, and the movement of the electron transport material to the photosensitive layer surface side is inhibited accordingly, so that the migration of the electron transport material to the photosensitive layer surface side is also reduced, and on the other hand, when the ratio a/b is 1.90 or less, the migration of the electron transport material to the photosensitive layer surface side is reduced, and the movement of the hole transport material to the photosensitive layer surface side is inhibited accordingly, so that the migration of the hole transport material to the photosensitive layer surface side is also reduced.

Therefore, it can be considered that, in an electrophotographic photoreceptor including a conductive support and at least a photosensitive layer and a protective layer (an outermost layer) provided on the conductive support, when the protective layer (the outermost layer) has a structure obtained by polymerizing a compound having a chain polymerizable functional group, the photosensitive layer in contact with the protective layer (outermost layer) contains at least a hole transport material and an electron transport material, and a ratio (a/b) of a molecular weight a of the hole transport material to a molecular weight b of the electron transport material is 1.40 or more and 1.90 or less, an electrophotographic photoreceptor having a high Martens hardness, a high elastic deformation ratio, and excellent adhesion between the photosensitive layer and the protective layer (the outermost layer) can be obtained.

Further, from the results of the tests conducted by the present inventors and the results of above Examples and Comparative Examples, it is found that, from the viewpoint of further improving the adhesion between the photosensitive layer and the protective layer (the outermost layer), the hole transport material preferably has a structure in which at least one aromatic group bonded to a nitrogen (N) atom has a substituent in at least one ortho-position, and among them, more preferably has a structure in which at least one aromatic group bonded to a nitrogen (N) atom has substituents in two ortho-positions.

For example, referring to above Examples, in the hole transport materials (HTM48 and HTM42) used in Examples 1 and 3, respectively, an aromatic group bonded to a nitrogen (N) atom has a substituent at one ortho-position. On the other hand, in the hole transport materials (HTM40 and HTM43) used in Examples 2 and 4, respectively, one aromatic group bonded to a nitrogen (N) atom has substituents at two ortho-positions, showing even more excellent adhesion. It is considered that this is because the aromatic group having substituents at two ortho-positions has strong steric repulsion with other substituents bonded to the N atom, so that the aromatic group takes a steric configuration rotated with respect to a plane formed by the N atom and the other substituents bonded to the N atom. It is considered that this is because the aromatic group taking the rotated steric configuration exerts an anchor effect on the binder resin, and thus has an effect of preventing the concentration of the hole transport material on the photosensitive layer surface.

The photoreceptors in above Examples are all positively charged single-layered electrophotographic photoreceptors, but as described above, the problems of the present invention can be solved by improving the configuration of the photosensitive layer in contact with the protective layer (the outermost layer). Therefore, it can be understood that with such a configuration, the problem can be solved in the same manner as in Examples even with a photoreceptor other than the positively charged single-layered electrophotographic photoreceptor.

The invention claimed is:

1. An electrophotographic photoreceptor comprising:

a conductive support; and a photosensitive layer and a protective layer disposed on the conductive support, wherein the protective layer comprises a polymer obtained by polymerizing a compound having a chain polymerizable functional group, and the photosensitive layer in contact with the protective layer comprises a hole transport material satisfying the following formula (1) and an electron transport material satisfying the following formula (2), the electron transport material comprises a compound represented by the following formula (6), the compound represented by the following formula (6) comprises a compound represented by the following formula (7) or (8):

$$600 \leq a \quad (1)$$

$$400 \leq b \quad (2)$$

in the formula (1), a represents a molecular weight of the hole transport material, and in the formula (2), b represents a molecular weight of the electron transport material, Formula (6)

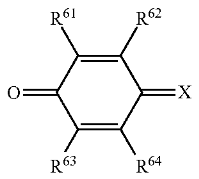

in the formula (6), $R^{61}$ to $R^{64}$ each independently represents a hydrogen atom, an alkyl group having 1 or more and 20 or less carbon atoms which may be substituted, or an alkenyl group having 2 or more and 20 or less carbon atoms which may be substituted, $R^{61}$ and $R^{62}$ or $R^{63}$ and $R^{64}$ may be bonded to each other to form a cyclic structure, and X represents an organic residue having a molecular weight of 120 or more and 250 or less;

Formula (7)

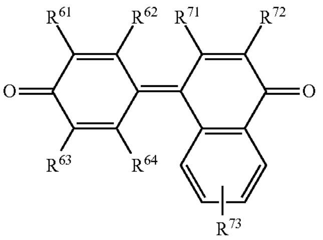

in the formula (7), $R^{71}$ to $R^{73}$ each independently represent a hydrogen atom, a halogen atom, or an alkyl group having 1 or more and 6 or less carbon atoms;

Formula (8)

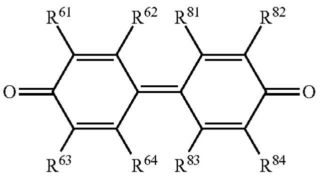

in the formula (8), $R^{81}$ to $R^{84}$ each independently represent a hydrogen atom, a halogen atom, or an alkyl group having 1 or more and 6 or less carbon atoms.

2. The electrophotographic photoreceptor according to claim 1, wherein the photosensitive layer is a single layer comprising a binder resin, a charge generation material, the hole transport material, and the electron transport material.

3. The electrophotographic photoreceptor according to claim 2, wherein the photosensitive layer satisfies the following formula (3), $$0.15 \leq (A/a)+(B/b) \quad (3)$$

in the formula (3), A represents a content (part by mass) of the hole transport material with respect to 100 of a binder resin content, a represents the molecular weight of the hole transport material, B represents a content (part by mass) of the electron transport material with respect to 100 of the binder resin content, and b represents the molecular weight of the electron transport material.

4. The electrophotographic photoreceptor according to claim 2, wherein the photosensitive layer satisfies the following formula (4), $$0.80 \leq A/B \leq 3.00 \quad (4)$$

in the formula (4), A represents a content (part by mass) of the hole transport material with respect to 100 of a binder resin content, and B represents a content (part by mass) of the electron transport material with respect to 100 of the binder resin content.

5. The electrophotographic photoreceptor according to claim 2, wherein the photosensitive layer satisfies the following formula (5), $$1.20 \leq (B/b)/(A/a) \leq 1.60 \quad (5)$$

in the formula (5), A represents a content (part by mass) of the hole transport material with respect to 100 of a binder resin content, a represents the molecular weight of the hole transport material, B represents a content (part by mass) of the electron transport material with respect to 100 of the binder resin content, and b represents the molecular weight of the electron transport material.

6. The electrophotographic photoreceptor according to claim 1, wherein the hole transport material satisfies the following formula (1'), $$600 \leq a \leq 1200 \quad (1')$$

in the formula (1'), a represents the molecular weight of the hole transport material.

7. The electrophotographic photoreceptor according to claim 1, wherein the electron transport material satisfies the following formula (2'), $$400 \leq b \leq 1000 \quad (2')$$

in the formula (2'), b represents the molecular weight of the electron transport material.

8. The electrophotographic photoreceptor according to claim 1, wherein a ratio (a/b) of the molecular weight of the hole transport material a to the molecular weight of the electron transport material b is 1.40 or more and 1.90 or less.

9. The electrophotographic photoreceptor according to claim 1, wherein the electrophotographic photoreceptor is positively charged.

10. The electrophotographic photoreceptor according to claim 1, wherein the protective layer comprises a polymer obtained by radically polymerizing the compound having a chain polymerizable functional group.

11. The electrophotographic photoreceptor according to claim 1, wherein the protective layer comprises metal oxide fine particles.

12. The electrophotographic photoreceptor according to claim 11, wherein the metal oxide fine particles are surface-treated with a surface treatment agent having a polymerizable functional group.

13. The electrophotographic photoreceptor according to claim 1, wherein the compound having a chain polymerizable functional group comprises a urethane acrylate.

14. An electrophotographic photoreceptor cartridge comprising:

the electrophotographic photoreceptor according to claim 1.

15. An image forming device comprising:

the electrophotographic photoreceptor according to claim 1.

16. An electrophotographic photoreceptor comprising:

a conductive support;

a photosensitive layer disposed on the conductive support; and an outermost layer disposed on the photosensitive layer, wherein the outermost layer comprises a polymer obtained by polymerizing a compound having a chain polymerizable functional group, and the photosensitive layer in contact with the outermost layer comprises a hole transport material satisfying the following formula (1) and an electron transport material satisfying the following formula (2), the electron transport material comprises a compound represented by the following formula (6), the compound represented by the following formula (6) comprises a compound represented by the following formula (7) or (8):

$$600 \leq a \quad (1)$$

$$400 \leq b \quad (2)$$

in the formula (1), a represents a molecular weight of the hole transport material, and in the formula (2), b represents a molecular weight of the electron transport material, Formula (6)

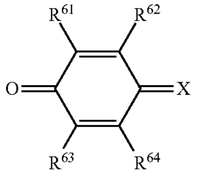

in the formula (6), $R^{61}$ to $R^{64}$ each independently represents a hydrogen atom, an alkyl group having 1 or more and 20 or less carbon atoms which may be substituted, or an alkenyl group having 2 or more and 20 or less carbon atoms which may be substituted, $R^{61}$ and $R^{62}$ or $R^{63}$ and $R^{64}$ may be bonded to each other to form a cyclic structure, and X represents an organic residue having a molecular weight of 120 or more and 250 or less;

Formula (7)

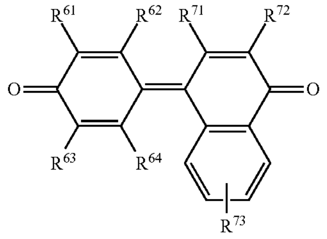

in the formula (7), $R^{71}$ to $R^{73}$ each independently represent a hydrogen atom, a halogen atom, or an alkyl group having 1 or more and 6 or less carbon atoms;

Formula (8)

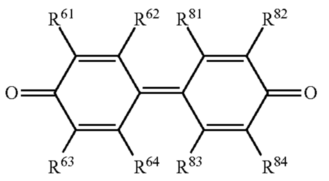

in the formula (8), R81 to R84 each independently represent a hydrogen atom, a halogen atom, or an alkyl group having 1 or more and 6 or less carbon atoms.

17. An electrophotographic photoreceptor comprising:

a conductive support; and a photosensitive layer and a protective layer disposed on the conductive support, wherein the protective layer comprises a polymer obtained by polymerizing a compound having a chain polymerizable functional group, the photosensitive layer in contact with the protective layer comprises a binder resin, a hole transport material, and an electron transport material, and the photosensitive layer in contact with the protective layer satisfies the following formula (5), $$1.20 \le (B/b)/(A/a) \le 1.60 \quad (5)$$

in the formula (5), A represents a content (part by mass) of the hole transport material with respect to 100 of the binder resin content, a represents a molecular weight of the hole transport material, B represents a content (part by mass) of the electron transport material with respect to 100 of the binder resin content, and b represents a molecular weight of the electron transport material, the electron transport material comprises a compound represented by the following formula (6), the compound represented by the following formula (6) comprises a compound represented by the following formula (7) or (8):

Formula (6)

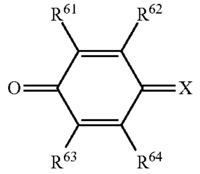

in the formula (6), $R^{61}$ to $R^{64}$ each independently represents a hydrogen atom, an alkyl group having 1 or more and 20 or less carbon atoms which may be substituted, or an alkenyl group having 2 or more and 20 or less carbon atoms which may be substituted, $R^{61}$ and $R^{62}$ or $R^{63}$ and $R^{64}$ may be bonded to each other to form a cyclic structure, and X represents an organic residue having a molecular weight of 120 or more and 250 or less;

Formula (7)

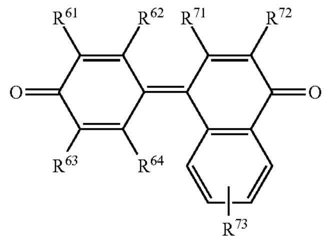

in the formula (7), $R^{71}$ to $R^{73}$ each independently represent a hydrogen atom, a halogen atom, or an alkyl group having 1 or more and 6 or less carbon atoms;

Formula (8)

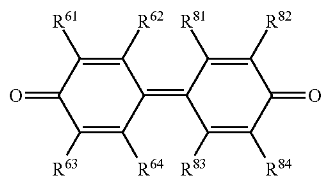

in the formula (8), $R^{81}$ to $R^{84}$ each independently represent a hydrogen atom, a halogen atom, or an alkyl group having 1 or more and 6 or less carbon atoms.

18. An electrophotographic photoreceptor comprising:

a conductive support; and a photosensitive layer and a protective layer disposed on the conductive support, wherein the protective layer comprises a polymer obtained by polymerizing a compound having a chain polymerizable functional group, the photosensitive layer in contact with the protective layer comprises a hole transport material and an electron transport material, and a ratio (a/b) of a molecular weight of the hole transport material a to a molecular weight of the electron transport material b is 1.40 or more and 1.90 or less, the electron transport material comprises a compound represented by the following formula (6), the compound represented by the following formula (6) comprises a compound represented by the following formula (7) or (8);

Formula (6)

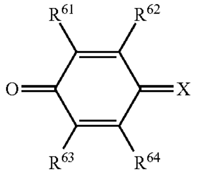

in the formula (6), $R^{61}$ to $R^{64}$ each independently represents a hydrogen atom, an alkyl group having 1 or more and 20 or less carbon atoms which may be substituted, or an alkenyl group having 2 or more and 20 or less carbon atoms which may be substituted, $R^{61}$ and $R^{62}$ or $R^{63}$ and $R^{64}$ may be bonded to each other to form a cyclic structure, and X represents an organic residue having a molecular weight of 120 or more and 250 or less;

Formula (7)
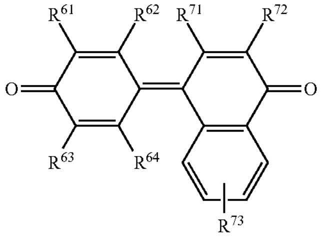
in the formula (7), $R^{71}$ to $R^{73}$ each independently represent a hydrogen atom, a halogen atom, or an alkyl group having 1 or more and 6 or less carbon atoms;
Formula (8)
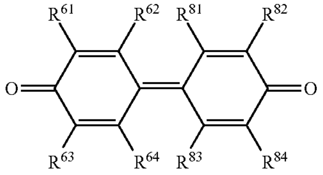
in the formula (8), $R^{81}$ to $R^{84}$ each independently represent a hydrogen atom, a halogen atom, or an alkyl group having 1 or more and 6 or less carbon atoms.
* * * * *